(12) United States Patent
Hagiwara

(10) Patent No.: US 7,949,087 B2
(45) Date of Patent: May 24, 2011

(54) RADIOGRAPHY APPARATUS

(75) Inventor: Akira Hagiwara, Tokyo (JP)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 682 days.

(21) Appl. No.: 11/952,790

(22) Filed: Dec. 7, 2007

(65) Prior Publication Data

US 2008/0152076 A1    Jun. 26, 2008

(30) Foreign Application Priority Data

Dec. 11, 2006   (JP) ................. 2006-333788

(51) Int. Cl.
*A61B 6/03*   (2006.01)

(52) U.S. Cl. .......................................................... 378/4

(58) Field of Classification Search ................ 378/4–20; 382/100–325
See application file for complete search history.

(56) References Cited

U.S. PATENT DOCUMENTS

| | | | |
|---|---|---|---|
| 5,448,607 A * | 9/1995 | McKenna ........................... 378/4 |
| 6,266,453 B1 * | 7/2001 | Hibbard et al. .............. 382/294 |
| 6,430,253 B1 | 8/2002 | Oikawa | |
| 6,496,560 B1 * | 12/2002 | Lin et al. ......................... 378/62 |
| 6,628,743 B1 * | 9/2003 | Drummond et al. .............. 378/8 |
| 6,744,844 B2 | 6/2004 | Horiuchi | |
| 6,795,522 B2 | 9/2004 | Nishide et al. | |
| 7,173,997 B2 | 2/2007 | Hagiwara | |

(Continued)

FOREIGN PATENT DOCUMENTS

JP       2002-065661       3/2002

(Continued)

OTHER PUBLICATIONS

Pandharipande et al., Perfusion Imaging of the Liver: Current Challenges and Future Goals, Mar. 2005, Radiology, vol. 234, pp. 661-673.*

(Continued)

*Primary Examiner* — Edward J Glick
*Assistant Examiner* — John M Corbett
(74) *Attorney, Agent, or Firm* — Armstrong Teasdale LLP

(57) ABSTRACT

For the purpose of improving efficiency in diagnosis by performing image reconstruction for slice planes lying at the same position in a subject both in a forward direction FD and backward direction BD, an amount of positional offset 'dz' is acquired, which amount represents a difference in a body axis direction 'z' along the forward direction FD and backward direction BD between a first subject position and a second subject position, the first subject position being a position to which a region to be imaged in the subject laid on a cradle 401 is moved when the cradle 401 is moved in the forward direction FD, and the second subject position being a position to which the region to be imaged in the subject laid on the moving cradle 401 is moved when the cradle 401 is moved in the backward direction BD such that the region to be imaged in the subject coincides with the first subject position. Then, respective pixel positions in the forward-path image and backward-path image are corrected based on the amount of positional offset 'dz' such that the pixel positions lie at positions corresponding to each other in the body axis direction 'z' along the forward direction FD and backward direction BD.

20 Claims, 12 Drawing Sheets

(a)

(b)

U.S. PATENT DOCUMENTS

| | | | |
|---|---|---|---|
| 2004/0008819 A1* | 1/2004 | Drummond et al. | 378/162 |
| 2007/0009080 A1* | 1/2007 | Mistretta | 378/4 |
| 2009/0080779 A1* | 3/2009 | Chefd'hotel et al. | 382/209 |

FOREIGN PATENT DOCUMENTS

| | | |
|---|---|---|
| JP | 2002-095655 | 4/2002 |
| JP | 2005-137389 | 6/2005 |

OTHER PUBLICATIONS

Oldham et al., Cone-beam-CT guided radiation therapy: A model for on-line application, 2005, Radiotherapy and Oncology, vol. 75, pp. 271.e1-271.e8.*

Platten et al., Siemens Sensation 16 CT Scanner Technical Evaluation, 2004, MHRA 04037, ISBN 1 84182 853 X, 32 Pages.*

\* cited by examiner

RADIOGRAPHY APPARATUS

CROSS REFERENCE TO RELATED APPLICATIONS

This application claims the benefit of Japanese Patent Application No. 2006-333788 filed Dec. 11, 2006.

BACKGROUND OF THE INVENTION

The present invention relates to a radiography apparatus. Particularly, the present invention relates to a radiography apparatus for image-reconstructing a forward-path image and a backward-path image by performing a scan while moving a cradle on which a subject is laid in a forward direction, and performing a scan while moving the cradle in a backward direction opposite to the forward direction.

A radiography apparatus such as an X-ray CT (Computed Tomography) apparatus performs a scan for a region to be imaged in a subject by emitting radiation such as X-rays toward the region to be imaged and detecting radiation passing through the region to be imaged in the subject to acquire projection data for the region to be imaged. Based on the projection data obtained by performing the scan, a slice image in a slice plane through the region to be imaged is then image-reconstructed. Such a radiography apparatus is employed in a wide variety of applications including medical applications and industrial applications.

In performing such a scan, a scan is performed on a region to be imaged in the subject by a scan gantry in the X-ray CT apparatus moving an X-ray tube and a multi-row X-ray detector such that they rotate around a subject centering a direction of a body axis of the subject laid on a cradle. At that time, the X-ray tube emits toward the region to be imaged in the subject, for example, cone-shaped X-rays that radially extend in a channel direction, which lies along a direction of rotation around the subject, and in a row direction, which lies along an axis of the rotation. The multi-row X-ray detector in which a plurality of detector elements are arranged along the channel direction and row direction then detects X-rays passing through the region to be imaged in the subject to thereby generate projection data.

This scan is performed in a scan scheme such as an axial scan scheme, helical scan scheme or the like.

In addition, there has been proposed a shuttle scan scheme in which a scan is performed at a position upon which X-rays impinge while moving the cradle on which the subject is laid in a forward direction and while moving the cradle in a backward direction (for example, see Japanese Patent Application Laid Open No. 2002-65661, Japanese Patent Application Laid Open No. 2005-137389, and Japanese Patent Application Laid Open No. 2002-95655).

A scheme for performing a scan in the shuttle scan scheme in combination with the helical scan scheme is generally referred to as helical shuttle scan scheme. On the other hand, a scheme for performing a scan in the shuttle scan scheme in combination with the axial scan scheme is generally referred to as axial shuttle scan scheme.

Based on the projection data obtained by performing such a scan, a plurality of slice images are then image-reconstructed for a plurality of axial planes that are consecutively arranged in the direction of the body axis of the subject, for example. At that time, weighted addition processing is applied to projection data elements that face each other, and slice images each corresponding to an axial plane, which is a perpendicular plane having a perpendicular lying in the body axis direction, are image-reconstructed according to a Feldkamp-based image reconstructing technique, such as that generally referred to as a three-dimensional backprojection technique or a cone-beam backprojection technique, for example.

SUMMARY OF THE INVENTION

When the cradle on which the subject is laid is moved, however, a force is applied to the subject along a direction of the cradle's movement, causing the subject to be shifted relative to the cradle. Thus, in performing a scan in the aforementioned shuttle scan scheme, a position to which the subject is moved when the cradle is moved in the forward direction, and a position to which the subject is moved when the cradle is moved in the backward direction opposite to the forward direction may be different from each other, even if the cradle is intended to be moved to reach the same position after movement in the forward direction and in the backward direction. Therefore, when an attempt is made to display a forward-path image that is image-reconstructed for a slice plane using projection data obtained by performing a scan while moving the cradle in the forward direction, and a backward-path image produced by image reconstruction on the same plane as that for the forward-path image using projection data obtained by performing a scan while moving the cradle in the backward direction, the slice images may be reconstructed in slice planes lying at positions different from each other in the subject in practice due to the aforementioned phenomenon even if the cradle lies at the same position in a direction along the forward direction and backward direction, thus making it difficult to properly display the images. Therefore, it is sometimes difficult to improve efficiency in diagnosis because of inadequate image quality.

Especially in performing a scan in the shuttle scan scheme on a region to be imaged for a slice plane containing tissue such as an organ within the subject, it is difficult to fix the position of tissue such as an organ within the subject even if the subject is firmly supported on the cradle, and therefore, a force is applied to the tissue such as an organ along a direction in which the cradle is moved, resulting in the aforementioned problem manifesting itself.

Moreover, when performing a scan in the shuttle scan scheme, it is sometimes a common practice to image-reconstruct a plurality of forward-path images and a plurality of backward-path images for a plurality of axial planes having a perpendicular lying in a direction in which the cradle is moved in the forward direction and backward direction such that the images are alternately arranged at positions different from each other in a region to be imaged in the subject, and then, alternately display the forward-path images and backward-path images on a display screen as a moving picture along the direction in which the cradle is moved in the forward direction and backward direction. Since according to the method, many forward-path images and backward-path images can be obtained in a direction of movement in the forward direction and backward direction, the image frames can be displayed with high resolution in a moving picture.

However, due to the aforementioned phenomenon, the forward-path image and backward-path image are sometimes image-reconstructed in axial planes different from a reference position in practice, and thus, when they are consecutively and sequentially displayed as the frames in a moving picture, an organ etc. within the subject may be displayed to be fluctuating as if it were pulsating. Thus, it is sometimes difficult to improve efficiency in diagnosis because of inadequate image quality.

Accordingly, it is an object of the present invention to provide a radiography apparatus with which image quality is improved to enable improvement of efficiency in diagnosis.

To attain the aforementioned object, a radiography apparatus in accordance with the present invention has an scanning table section comprising a cradle on which a subject is laid, for moving said cradle; a scanning section for performing a scan involving emitting radiation toward a region to be imaged in said subject laid on said cradle moved in said scanning table section and detecting said radiation passing through said region to be imaged to thereby acquire projection data for said region to be imaged; and a data processing section for image-reconstructing an image for said region to be imaged based on said projection data acquired by said scanning section, said scanning table section moving said cradle in a forward direction and in a backward direction relative to said scanning section, said scanning section performing said scan as said cradle is being moved in said forward direction to thereby acquire a first set of projection data as said projection data, and performing said scan as said cradle is being moved in said backward direction to thereby acquire a second set of projection data as said projection data, and said data processing section image-reconstructing a forward-path image as said image based on said first set of projection data, and image-reconstructing a backward-path image as said image based on said second set of projection data, wherein said data processing section comprises an amount-of-positional-offset acquiring section for acquiring an amount of positional offset that represents a difference in a direction along said forward direction and said backward direction between a first subject position and a second subject position, said first subject position being a position to which said region to be imaged in said subject laid on said cradle is moved when said cradle is moved in said forward direction in said scanning table section, and said second subject position being a position to which said region to be imaged in said subject laid on said cradle is moved when said cradle is moved in said backward direction such that said region to be imaged in said subject coincides with said first subject position, for producing said forward-path image and said backward-path image based on said amount of positional offset acquired by said amount-of-positional-offset acquiring section such that respective pixel positions in said forward-path image and said backward-path image lie at positions corresponding to each other in the direction along said forward direction and said backward direction.

Preferably, said data processing section image-reconstructs a first image based on said first set of projection data and image-reconstructs a second image based on said second set of projection data, and said amount-of-positional-offset acquiring section calculates said amount of positional offset by applying comparison processing to said first image and said second image image-reconstructed by said data processing section.

Preferably, said data processing section produces said first image and said second image as said forward-path image and said backward-path image, respectively, by shifting for correction the pixel position in at least one of said first image and said second image based on said amount of positional offset acquired by said amount-of-positional-offset acquiring section such that respective pixel positions in said first image and said second image lie at positions corresponding to each other in the direction along said forward direction and said backward direction in said region to be imaged.

Preferably, said data processing section image-reconstructs said first image for a plane along the direction in which said cradle is moved in said forward direction, and image-reconstructs said second image for the plane for which said first image is image-reconstructed.

Preferably, said data processing section image-reconstructs said first image by image-reconstructing a plurality of third images for a plurality of planes having a perpendicular lying in the direction in which said cradle is moved in said forward direction and said backward direction based on said first set of projection data and then reformatting said image-reconstructed plurality of third images, and image-reconstructs said second image by image-reconstructing a plurality of fourth images for a plurality of planes having a perpendicular lying in the direction in which said cradle is moved in said forward direction and said backward direction based on said second set of projection data and then reformatting said image-reconstructed plurality of fourth images.

Preferably, said amount-of-positional-offset acquiring section calculates said amount of positional offset based on a pixel position of a first feature-extracted region extracted by performing feature extraction processing on said first image image-reconstructed by said data processing section, and a pixel position of a second feature-extracted region extracted to match said first feature-extracted region extracted in said first image by performing feature extraction processing on said second image image-reconstructed by said data processing section.

Preferably, the present apparatus has a display section for displaying on its display screen an image image-reconstructed for said region to be imaged by said data processing section.

Preferably, the present apparatus has a display section for displaying on its display screen an image image-reconstructed for said region to be imaged by said data processing section; and an input section via which input data is input by an operator, wherein said data processing section image-reconstructs a first image based on said first set of projection data and image-reconstructs a second image based on said second set of projection data, said display section displays said first image and said second image on said display screen, said input section is input by the operator with a pixel position of a first specific region in said first image displayed at said display section, and input by the operator with a pixel position of a second specific region, corresponding to said first specific region, in said second image displayed at said display section, and said amount-of-positional-offset acquiring section acquires said amount of positional offset by calculating it based on the pixel position of said first specific region and the pixel position of said second specific region input via said input section.

Preferably, the present apparatus has an input section via which input data is input by an operator, wherein said input section is input by the operator with amount-of-positional-offset data about said amount of positional offset as input data, and said amount-of-positional-offset acquiring section acquires said amount of positional offset based on said amount-of-positional-offset data input via said input section.

Preferably, when image-reconstructing said forward-path image for a plane having a perpendicular lying in the direction in which said cradle is moved in said forward direction and said backward direction based on said first set of projection data, and image-reconstructing said backward-path image for a plane having a perpendicular lying in the direction in which said cradle is moved in said forward direction and said backward direction based on said second set of projection data, said data processing section image-reconstructs said forward-path image and said backward-path image based on said amount of positional offset acquired by said amount-of-positional-offset acquiring section such that said forward-path image and said backward-path image both coincide with a position of a region to be imaged in said subject in the direction in which said cradle is moved in said forward direction and said backward direction.

Preferably, the present apparatus has a display section for displaying on its display screen an image image-reconstructed for said region to be imaged by the data processing section, wherein said data processing section image-reconstructs a plurality of said forward-path images and a plurality of said backward-path images such that they are alternately arranged at positions different from each other in a region to be imaged in said subject in the direction in which said cradle is moved in said forward direction and said backward direction, and said display section sequentially displays said forward-path images and said backward-path images produced by said data processing section alternately as a moving picture on said display screen along the direction in which said cradle is moved in said forward direction and said backward direction.

Preferably, said scanning table section moves said cradle such that the direction along said forward direction and said backward direction lies in a horizontal direction.

Preferably, said scanning section contains an imaging space for receiving therein said cradle moved in said scanning table section, and has an illuminating section for emitting said radiation toward said subject laid on said cradle in said imaging space; and a detecting section detecting said radiation emitted from said illuminating section and passing through said subject to thereby generate said projection data.

Preferably, said illuminating section emits X-rays as said radiation.

Preferably, said scanning section performs said scan in a helical scan scheme.

Preferably, said scanning section performs said scan in an axial scan scheme.

According to the present invention, a radiography apparatus with which image quality is improved to enable improvement of efficiency in diagnosis can be provided.

DETAILED DESCRIPTION OF THE INVENTION

Embodiment 1

Embodiment 1 in accordance with the present invention will now be described.

(Configuration of the Apparatus).

Figure 1:
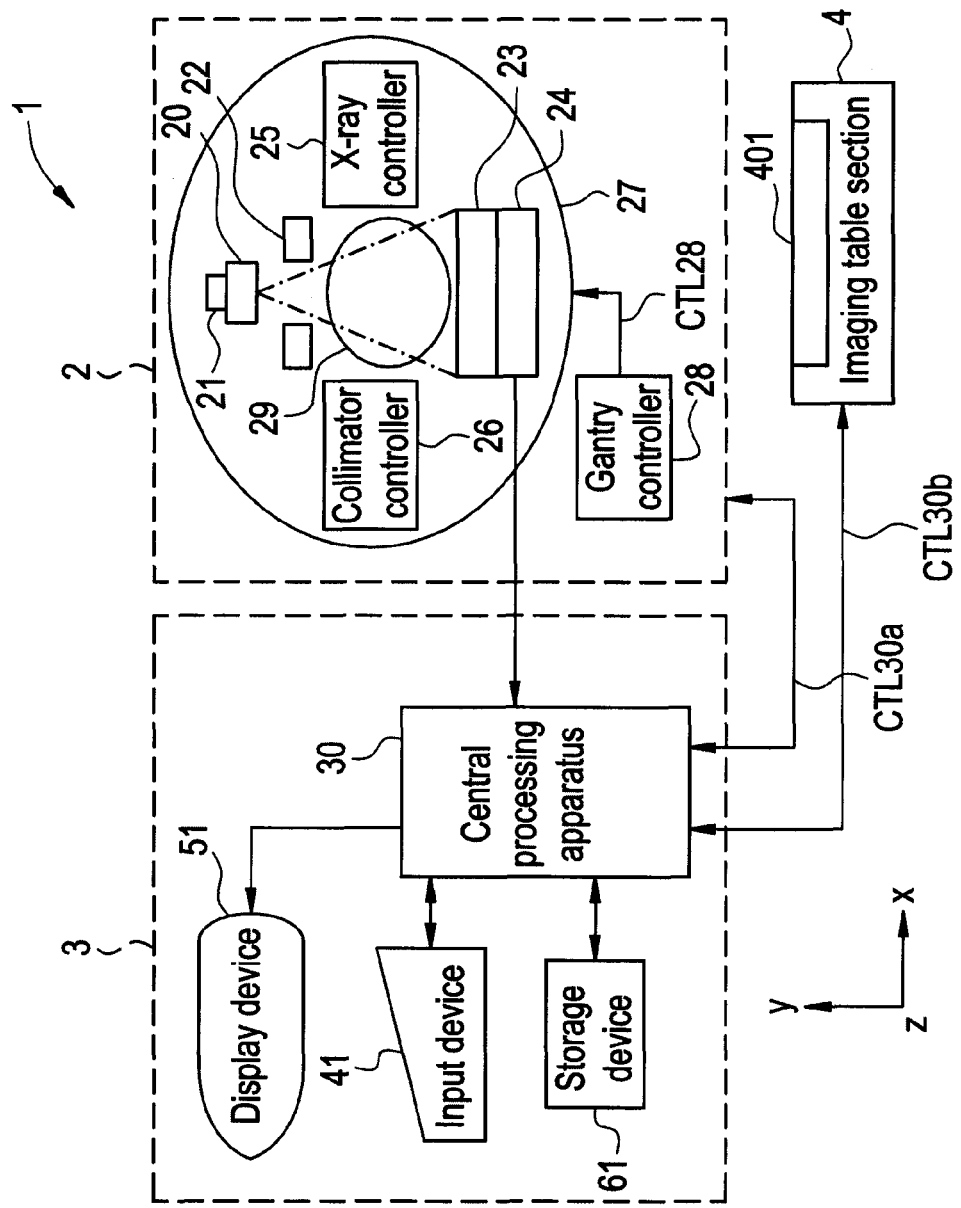
FIG. 1 is a block diagram showing the overall configuration of an X-ray CT apparatus 1 in Embodiment 1 in accordance with the present invention.
Figure 2:
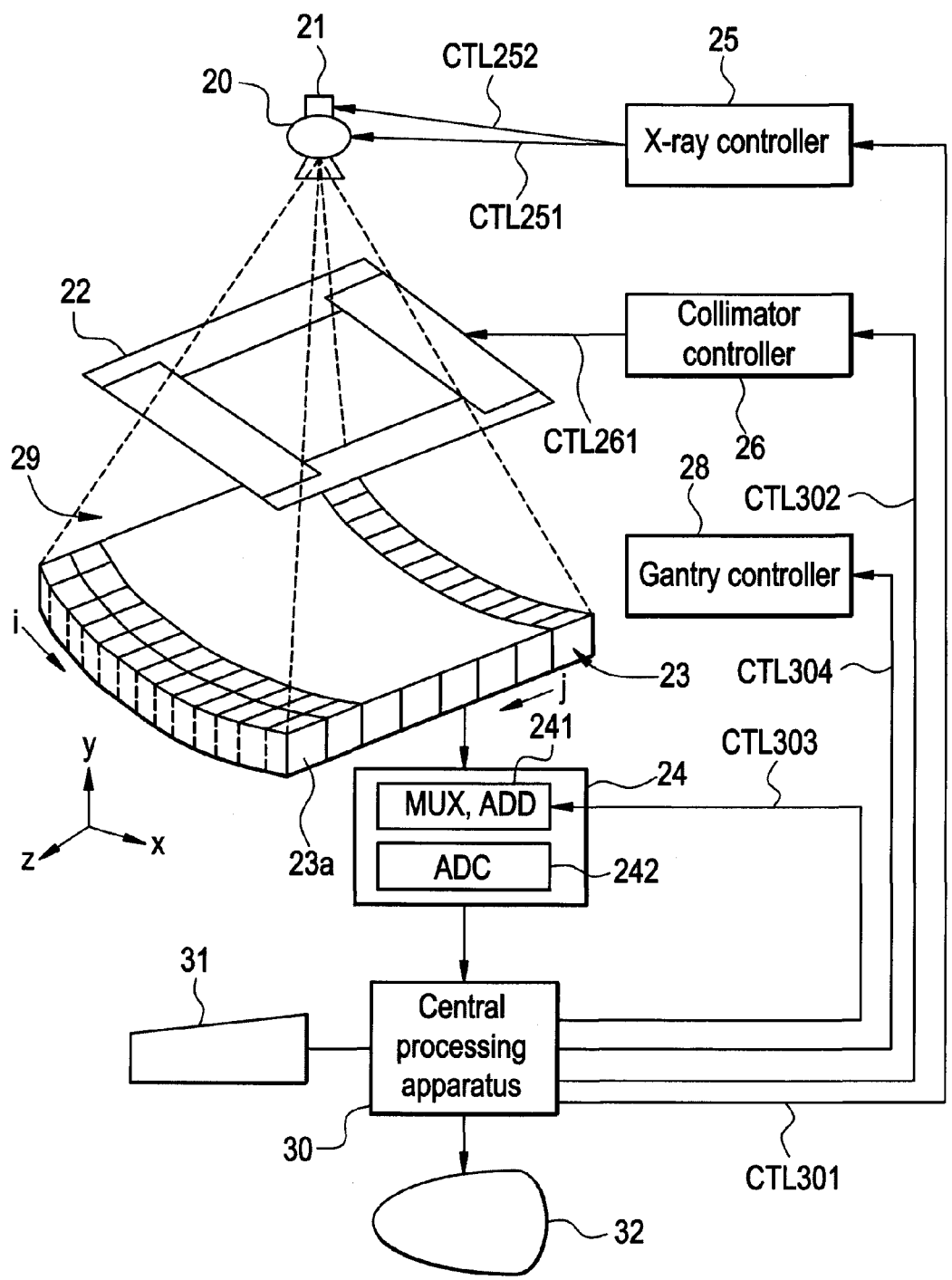
FIG. 2 is a diagram showing the main portion of the X-ray CT apparatus 1 in Embodiment 1 in accordance with the present invention.

FIG. 1 is a block diagram showing the overall configuration of an X-ray CT apparatus 1 in Embodiment 1 in accordance with the present invention, and FIG. 2 is a perspective view showing the main portion of the X-ray CT apparatus 1 in Embodiment 1 in accordance with the present invention.

As shown in FIG. 1, the X-ray CT apparatus 1 has a scan gantry 2, an operator console 3, and an scanning table section 4. The X-ray CT apparatus 1 performs a scan involving emitting X-rays toward a region to be imaged in a subject and detecting X-rays passing through the region to be imaged in the subject to thereby acquire projection data, which is used to image-reconstruct an image for the region to be imaged in the subject.

The scan gantry 2 will now be described.

As shown in FIG. 1, the scan gantry 2 has an X-ray tube 20, an X-ray tube moving section 21, a collimator 22, an X-ray detector 23, a data collecting section 24, an X-ray controller 25, a collimator controller 26, a rotating section 27, and a gantry controller 28. The scan gantry 2 contains an imaging space 29 for receiving therein a cradle 401 moved in an scanning table section 4, and in this imaging space 29, a scan in which the X-ray tube 20 emits X-rays toward the region to be imaged in the subject and the X-ray detector 23 detects X-rays passing through the region to be imaged in the subject is performed to thereby acquire projection data for the region to be imaged in the subject. At that time, in compliance with scan conditions specified via the operator console 3, which will be discussed later, the scan involving emitting X-rays toward the region to be imaged in the subject laid on the cradle 401 moved and received into the imaging space 29 by the scanning table section 4 and detecting X-rays passing through the region to be imaged in the subject is performed based on a control signal CTL30a output by the operator console 3 to acquire projection data for the region to be imaged in the subject.

In particular, the scan gantry 2 has the X-ray tube 20 and X-ray detector 23 disposed to face each other interposing therebetween the imaging space 29 into which the subject is carried, as shown in FIG. 2. The collimator 22 is disposed between the X-ray tube 20 and X-ray detector 23 for shaping X-rays emitted from the X-ray tube 20 toward the subject in the imaging space 29. The scan gantry 2 performs a scan involving emitting X-rays from the X-ray tube 20 toward the subject and detecting X-rays passing through the subject at the X-ray detector 23 at each view angle 'v' around the subject by rotating the X-ray tube 20, collimator 22 and X-ray detector 23 around the subject lying at the center to obtain projection data for the region to be imaged in the subject. It should be noted that the view angle 'v' designates an angle of the X-ray tube 20 rotated around the subject, where the y-direction lying in a plumb direction is defined as 0°, as shown in FIG. 1.

As will be discussed in detail later, according to the present embodiment, the scan gantry 2 performs a scan while moving the cradle 401 in a forward direction to thereby acquire a first set of projection data as projection data. Along therewith, it performs a scan while moving the cradle 401 in a backward direction to thereby acquire a second set of projection data as projection data. Specifically, while the rotating section 27 is rotating the X-ray tube 20 and X-ray detector 23 around the subject, the scan gantry 2 performs a forward-path scan in which the X-ray tube 20 emits X-rays toward the subject being moved by the scanning table section 4 in a forward direction in the direction 'z' of the body axis of the subject and the X-ray detector 23 detects X-rays passing through the subject, and a backward-path scan in which the X-ray tube 20 emits X-rays toward the subject being moved by the scanning table section 4 in a backward direction opposite to the forward direction and the X-ray detector detects X-rays passing through the subject. That is, the scan gantry 2 performs a scan in a shuttle scan scheme in combination with a helical scan scheme.

The components within the scan gantry 2 will now be described one by one.

The X-ray tube 20 is of a rotating-anode type, for example, for emitting X-rays toward a region to be imaged in the subject. The X-ray tube 20 emits X-rays with certain intensity to the region to be imaged in the subject through the collimator 22 based on a control signal CTL251 from the X-ray controller 25, as shown in FIG. 2. The X-ray tube 20 is rotated around the subject by the rotating section 27 centering the body axis direction 'z' along the direction in which the scanning table section 4 moves the subject into the imaging space 29, and emits X-rays from the circumference around the subject. At that time, the X-ray tube 20 emits X-rays radially emanating in a channel direction 'i' that is a rotating direction for the X-ray tube 20 being rotated by the rotating section 27, and in a row direction 'j' that is an axis-of-rotation direction for the rotation. The X-rays emitted from the X-ray tube 20 are shaped in a cone shape by the collimator 22, and projected on the side of the X-ray detector 23.

The X-ray tube moving section 21 moves the center of emission of the X-ray tube 20 in the row direction 'j' based on a control signal CTL252 output from the X-ray controller 25, as shown in FIG. 2.

The collimator 22 is disposed between the X-ray tube 20 and X-ray detector 23, as shown in FIG. 2. The collimator 22 comprises blocking plates for blocking X-rays for preventing penetration thereof, for example, and two such blocking plates are provided for each of the channel direction 'i' and row direction 'j.' The collimator 22 separately moves the two blocking plate each in the channel direction 'i' and row direction 'j' based on a control signal CTL261 from the collimator controller 26, to intercept the X-rays emitted by the X-ray tube 20 in these directions for shaping them in a cone shape, and adjust a coverage of irradiation by X-rays at the subject. Specifically, the collimator 22 changes the size of an aperture for passing X-rays emitted from the X-ray tube 20 by moving the blocking plates in the channel direction 'i' to adjust the angle of X-ray emission to a predetermined fan angle, and also changes the size of the aperture by moving the blocking plates in the row direction 'j' to adjust the angle of X-ray emission to a predetermined cone angle.

The X-ray detector 23 detects X-rays emitted from the X-ray tube 20 and passing through a region to be imaged in the subject in the imaging space 29 to thereby obtain projection data for the region to be imaged. The X-ray detector 23, along with the X-ray tube 20, rotates around the subject by the rotating section 27. It then detects X-rays emitted from the circumference around the subject by the X-ray tube 20 and passing through the region to be imaged in the subject to generate projection data.

In the present embodiment, the X-ray detector 23 has a plurality of detector elements 23a disposed therein, as shown in FIG. 2, for detecting X-rays emitted from the X-ray tube 20. The X-ray detector 23 is what is generally called a multi-row X-ray detector, and has, for example, the detector elements 23a two-dimensionally arranged in an array in the channel direction 'i' along the rotating direction of the X-ray tube 20 rotating around the subject in the imaging space 29 by the rotating section 27, and in the row direction 'j' along the direction of the axis of rotation that serves as a center axis when the X-ray tube 20 is rotated by the rotating section 27. For example, the X-ray detector 23 has about 1,000 detector elements 23a disposed in the channel direction 'i' and about 8 detector elements 23a disposed in the row direction 'j.' Moreover, the X-ray detector 23 has a concave, curved detecting surface formed by the plurality of two-dimensionally disposed detector elements 23a.

The detector elements 23a making up the X-ray detector 23 are made of a solid-state detector, for example, each having a scintillator (not shown) for converting X-rays into light and a photodiode (not shown) for converting the light, which has been converted by the scintillator, into an electrical charge. It should be noted that the detector elements 23a are not limited thereto, and may be those of, for example, a semiconductor type using cadmium tellurium (CdTe) or of an ionization chamber type using Xenon (Xe) gas. Moreover, a collimator (not shown) for preventing scattered X-rays from entering the detector elements 23a may be provided in the channel direction 'i' the X-ray detector 23.

The data collecting section 24 is provided for collecting projection data from the X-ray detector 23. The data collecting section 24 collects projection data by X-rays detected by the detector elements 23a in the X-ray detector 23, and outputs them to the operator console 3. As shown in FIG. 2, the data collecting section 24 has a selection/addition switching circuit (MUX, ADD) 241, and an analog-to-digital converter (ADC) 242. The selection/addition switching circuit 241 selects projection data from the detector elements 23a in the X-ray detector 23 or adds them in a varying combination depending upon a control signal CTL303 from a central processing apparatus 30, and outputs the result to the analog-to-digital converter 242. The analog-to-digital converter 242 converts the projection data selected or added in an arbitrary combination at the selection/addition switching circuit 241 from analog signals into digital signals, and outputs them to the central processing apparatus 30 for storage in a storage device 61.

The X-ray controller 25 outputs the control signal CTL251 to the X-ray tube 20 in response to a control signal CTL301 from the central processing apparatus 30, as shown in FIG. 2, for controlling emission of X-rays. The X-ray controller 25 controls, for example, the tube current, irradiation time and the like for the X-ray tube 20. The X-ray controller 25 also outputs the control signal CTL252 to the X-ray tube moving section 21 in response to the control signal CTL301 from the central processing apparatus 30, for making control to move the center of emission of the X-ray tube 20 in the row direction 'j.'

The collimator controller 26 outputs the control signal CTL261 to the collimator 22 in response to a control signal CTL 302 from the central processing apparatus 30, as shown in FIG. 2, for controlling the collimator 22 to shape X-rays emitted from the X-ray tube 20 toward the subject.

The rotating section 27 has a cylindrical shape having the imaging space 29 formed in its central portion, as shown in FIG. 1. The rotating section 27 drives a motor (not shown), for example, in response to a control signal CTL28 from the gantry controller 28, for rotation centering the direction 'z' of the body axis of the subject in the imaging space 29. In other words, the rotating section 27 rotates in the channel direction 'i' with the row direction 'j' serving as the axis of rotation. The rotating section 27 is provided thereon with the X-ray tube 20, X-ray tube moving section 21, collimator 22, X-ray detector 23, data collecting section 24, X-ray controller 25 and collimator controller 26, and the section 27 supports these components. The rotating section 27 supplies power to these components via a slip ring (not shown). Moreover, the rotating section 27 rotates these components around the subject to change the relative positional relationship between the subject carried into the imaging space 29 and the components in the rotating direction.

The gantry controller 28 outputs the control signal CTL28 to the rotating section 27 based on a control signal CTL304 from the central processing apparatus 30 in the operator console 3, as shown in FIGS. 1 and 2, for controlling the rotating section 27 to rotate.

The operator console 3 will now be described.

The operator console 3 has the central processing apparatus 30, an input device 41, a display device 51, and the storage device 61, as shown in FIG. 1.

The central processing apparatus 30 in the operator console 3 performs several kinds of processing based on instructions input by the operator via the input device 41. The central processing apparatus 30 comprises a computer that acts as several kinds of means according to programs.

Figure 3:
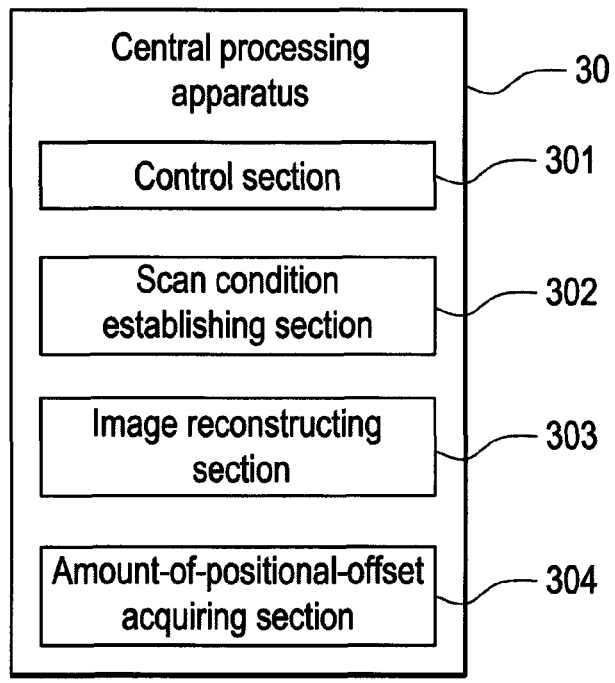
FIG. 3 is a block diagram showing the configuration of the central processing apparatus 30 in Embodiment 1 in accordance with the present invention.

FIG. 3 is a block diagram showing the configuration of the central processing apparatus 30 in Embodiment 1 in accordance with the present invention.

As shown in FIG. 3, the central processing apparatus 30 has a control section 301, a scan condition establishing section 302, an image reconstructing section 303, and an amount-of-positional-offset acquiring section 304. These sections will now be described one by one.

The control section 301 is provided for controlling the several components in the X-ray CT apparatus 1. The control section 301 controls the several components based on instructions input by the operator via the input device 41. For example, the control section 301 performs a scan by controlling the several components to act in conformity with scan conditions established by the scan condition establishing section 302 based on instructions input by the operator via the input device 41. In particular, the control section 301 outputs a control signal CTL30b to the scanning table section 4 to carry and move the subject into the imaging space 29. The control section 301 also outputs the control signal CTL304 to the gantry controller 28 to rotate the rotating section 27 in the scan gantry 2. The control section 301 also outputs the control signal CTL301 to the X-ray controller 25 to emit X-rays from the X-ray tube 20. The control section 301 also outputs the control signal CTL302 to the collimator controller 26 to control the collimator 22 for shaping X-rays. Finally, the control section 301 outputs the control signal CTL303 to the data collecting section 24 to make control to gather projection data obtained by the detector elements 23a in the X-ray detector 23.

The scan condition establishing section 302 establishes scan conditions for operating the several components in performing a scan based on scan parameters input by the operator via the input device 41. For example, the scan condition establishing section 302 establishes scan conditions for operating the several components according to slice thickness, scan start position, scan end position, scan pitch, X-ray beam width, tube current value, tube voltage value and the like.

In the present embodiment, the scan condition establishing section 302 performs planning of a scan so that the scan is performed in a helical shuttle scan scheme including a forward scan and a backward scan, as described earlier. The scan condition establishing section 302 then outputs data representing the established scan conditions to the control section 301 for controlling the several components.

The image reconstructing section 303 image-reconstructs a slice image as a digital image comprised of a plurality of pixels for a region to be imaged in the subject based on projection data collected by the data collecting section 24 by performing a scan. For example, the image reconstructing section 303 image-reconstructs images having pixel values assigned with CT values for a plurality of slice planes through the subject from projection data obtained by performing a scan. For example, a cone-beam backprojection technique is used to perform image reconstruction. Specifically, the image reconstructing section 303 uses a plurality of projection data elements that correspond to pixels on an image reconstruction plane to image-reconstruct an image representing a cross-sectional plane through the subject. At that time, the image reconstructing section 303 first performs pre-processing including offset correction, logarithmic correction, X-ray dose correction, sensitivity correction, etc. on projection data collected by the data collecting section 24. The image reconstructing section 303 then performs filtering processing on the pre-processed projection data. At that time, it performs filtering processing involving applying Fourier transform, convolution with an image reconstruction function, and then inverse Fourier transformation. Thereafter, the filtered projection data is subjected to three-dimensional backprojection processing and then post-processing to generate image data.

In the present embodiment, a forward-path image is image-reconstructed based on a first set of projection data obtained in a forward scan, and a backward-path image is image-reconstructed based on a second set of projection data obtained in a backward scan. At that time, based on an amount of positional offset acquired by the amount-of-positional-offset acquiring section 304, the forward-path image and backward-path image are produced such that respective pixel positions in the forward-path image and backward-path image lie at positions corresponding to each other in a direction along the forward direction and backward direction.

At that time, for example, a first coronal image is image-reconstructed based on the first set of projection data obtained in the forward scan for a coronal plane along the body axis direction 'z' in which the cradle 401 is moved in the forward direction, and a second coronal image is image-reconstructed based on the second set of projection data obtained in the backward scan for that coronal plane for which the first coronal image is image-reconstructed, details of which will be discussed later.

For example, a plurality of first axial images are first image-reconstructed based on the first set of projection data for a plurality of axial planes having a perpendicular lying in the body axis direction 'z' in which the cradle 401 is moved in the forward direction and backward direction, and then, the image-reconstructed plurality of first axial images are reformatted by MPR (Multi-Planar Reformatting) processing, for example, to thereby image-reconstruct the first coronal image. Next, a plurality of second axial images are image-reconstructed based on the second set of projection data for a plurality of axial planes having a perpendicular lying in the body axis direction 'z' in which the cradle 401 is moved in the forward direction and backward direction, and then, the image-reconstructed plurality of second axial images are reformatted by MPR processing, for example, to thereby image-reconstruct the second coronal image. It should be noted that the first and second coronal images may be produced by MIP (Maximum Intensity Projection) processing in place of MPR processing. Moreover, the images may be produced in a three-dimensional image here.

A pixel position in at least one of the first and second coronal images is then shifted for correction based on an amount of positional offset acquired by the amount-of-positional-offset acquiring section 304 such that respective pixel positions in the first coronal image and second coronal image lie at positions corresponding to each other in a region to be imaged in the body axis direction 'z' along the forward direction and backward direction, thereby producing the first coronal image and second coronal image as a forward-path image and a backward-path image, respectively.

The amount-of-positional-offset acquiring section 304 acquires an amount of positional offset that represents a difference in the body axis direction 'z' along the forward direction and backward direction between a first subject position and a second subject position, the first subject position being a position to which a region to be imaged in the subject laid on the cradle 401 is moved when the cradle 401 is moved in the forward direction in the scanning table section 4, and the second subject position being a position to which the region to be imaged in the subject laid on the cradle 401 is moved when the cradle 401 is moved in the backward direction such that the region to be imaged in the subject coincides with the first subject position.

In the present embodiment, the amount-of-positional-offset acquiring section 304 calculates an amount of positional offset by applying comparison processing to the first coronal image and second coronal image image-reconstructed by the image reconstructing section 303, details of which will be discussed later. At that time, the amount-of-positional-offset acquiring section 304 calculates the amount of positional offset based on a pixel position of a first feature-extracted region extracted by performing feature extraction processing on the first image-reconstructed coronal image, and a pixel position of a second feature-extracted region extracted to match the first feature-extracted region extracted in the first coronal image by performing feature extraction processing on the second image-reconstructed coronal image.

The input device 41 in the operator console 3 is comprised of a keyboard and a mouse, for example. The input device 41 supplies several kinds of information, such as scan parameters and subject information, and instructions to the central processing apparatus 30 based on an input operation made by the operator. For example, in specifying actual scan conditions, the input device 41 supplies data about the scan start position, scan end position, scan pitch, X-ray beam width, tube current value, and slice thickness as the scan parameters based on instructions from the operator.

The display device 51 in the operator console 3 comprises a CRT, for example, for displaying an image on its display screen based on a command from the central processing apparatus 30. For example, the display device 51 displays an image image-reconstructed by the image reconstructing section 303 on its display screen.

The storage device 61 in the operator console 3 is comprised of a memory for storing several kinds of data. The storage device 61 is accessed by the central processing apparatus 30 for its stored data as needed.

The scanning table section 4 will now be described.

The scanning table section 4 carries the subject into/out of the imaging space 29.

Figure 4:
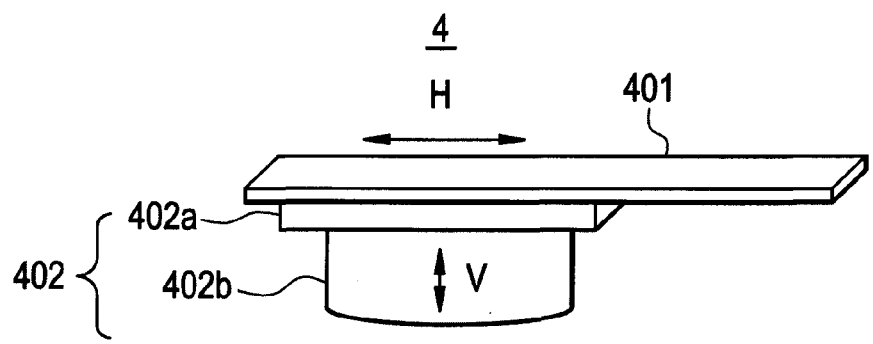
FIG. 4 is a perspective view showing the configuration of the scanning table section 4 in Embodiment 1 in accordance with the present invention.

FIG. 4 is a perspective view showing the configuration of the scanning table section 4 in Embodiment 1 in accordance with the present invention.

As shown in FIG. 4, the scanning table section 4 has a cradle 401 and a cradle moving section 402.

The cradle 401 in the scanning table section 4 has a top surface on which the subject is laid formed along a horizontal plane, and supports the subject on the top surface. For example, the subject is laid supinely on the table and supported on the cradle 401 in the scanning table section 4.

The cradle moving section 402 in the scanning table section 4 has a horizontal moving section 402a for moving the cradle 401 in a horizontal direction H along the direction 'z' of the body axis of the subject, and a vertical moving section 402b for moving the cradle 401 in a plumb direction V perpendicular to the horizontal direction H, and moves the cradle 401 based on the control signal CTL30b from the central processing apparatus 30 to carry the subject into the imaging space 29.

Figure 6:
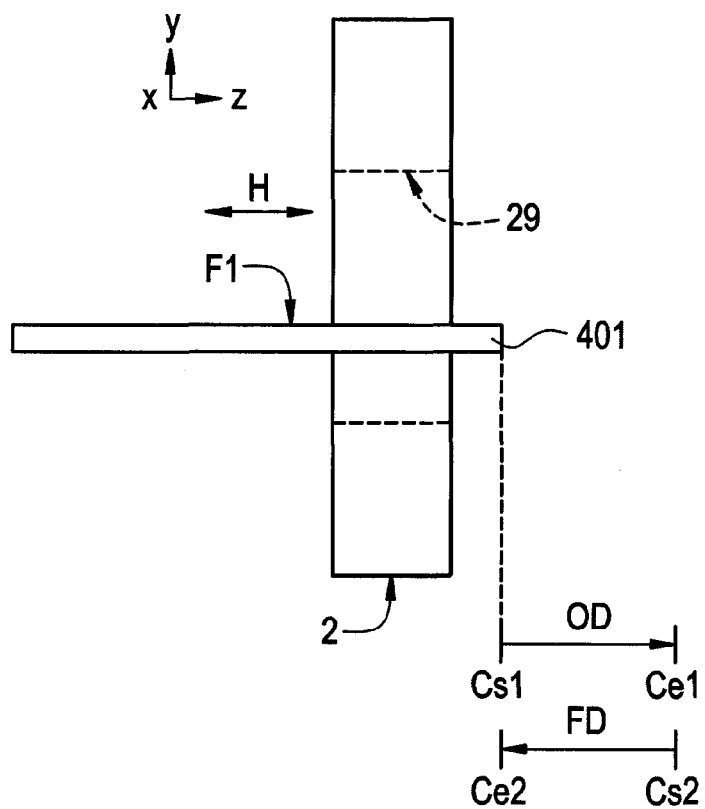
FIG. 6 is a side view showing a scan performed in Embodiment 1 in accordance with the present invention.

In the present embodiment, the scanning table section 4 shuttles the cradle 401 in a forward direction FD and a backward direction BD, as shown in FIG. 6, to perform a scan in a shuttle scan scheme corresponding to scan conditions established by the scan condition establishing section 302.

(Operation)

The operation of the X-ray CT apparatus 1 in the present embodiment will now be described.

Figure 5:
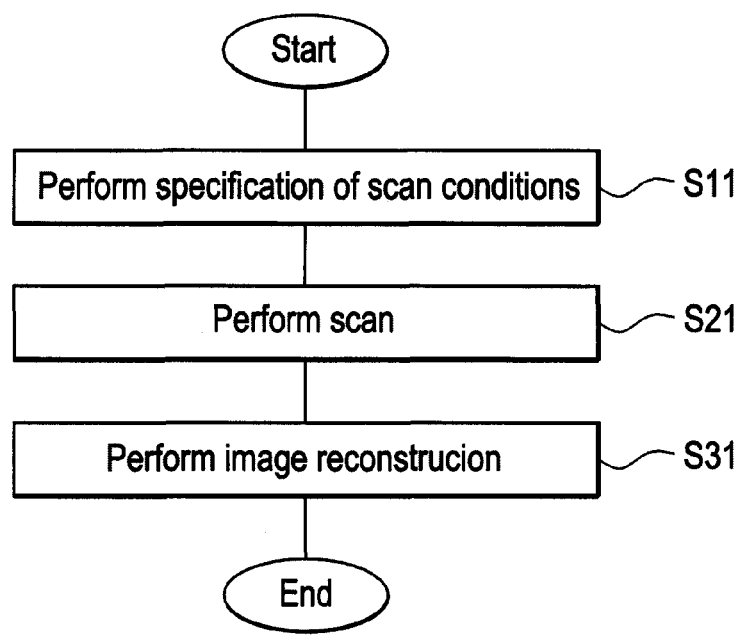
FIG. 5 is a flow chart showing an operation of the X-ray CT apparatus 1 in Embodiment 1 in accordance with the present invention.

FIG. 5 is a flow chart showing an operation of the X-ray CT apparatus 1 in Embodiment 1 in accordance with the present invention.

First, specification of scan conditions is performed, as shown in FIG. 5 (S11).

At this step, the operator views a scout image produced by performing a scout scan on a display screen of the display device 51, and inputs scan parameters for performing a scan on a region to be imaged in the subject to the input device 41. For example, the operator inputs the scan parameters including scan scheme, scan start position, scan end position, scan pitch, X-ray beam width, tube current value, slice thickness, table speed, helical pitch, noise index, starting acceleration, ending acceleration, name of an imaged portion and the like to the input device 41 through a key input operation or graphical input operation made by the operator. Based on the input operation made by the operator, the input device 41 outputs the scan parameters to the central processing apparatus 30. Based on the scan parameters input by the operator via the input device 41, the scan condition establishing section 302 in the central processing apparatus 30 establishes the scan conditions for operating the several components in performing a scan. In the present embodiment, the scan condition establishing section 302 performs planning of a scan so that a scan is performed in a helical shuttle scan scheme.

Next, a scan is performed, as shown in FIG. 5 (S21).

At this step, the operator inputs a command to start a scan to the input device 41 to cause the control section 301 to control the several components for starting a scan on the subject. The scan is run in conformity with the scan conditions established as described above.

FIG. 6 is a side view showing a scan performed in Embodiment 1 in accordance with the present invention.

As shown in FIG. 6, the scanning table section 4 moves the cradle 401 on which the subject is laid over the top surface F1 extending along the horizontal direction H, the movement being made in a forward direction FD and in a backward direction BD in the body axis direction 'z' in the imaging space 29 in the scan gantry 2. At that time, the scan gantry 2 performs a scan in a helical scan scheme involving emitting X-rays toward the subject laid on the cradle 401 and detecting X-rays passing through the region to be imaged in the subject.

Specifically, as shown in FIGS. 1 and 2, while the rotating section 27 is rotating the X-ray tube 20 and X-ray detector 23 around the subject, the scan gantry 2 performs a forward scan in which the X-ray tube 20 emits X-rays toward the subject laid on the cradle 401 moved by the scanning table section 4 in the forward direction FD in the direction 'z' of the body axis of the subject and the X-ray detector 23 detects X-rays passing through the subject.

Thereafter, the scan gantry 2 performs a backward scan in which the X-ray tube 20 emits X-rays toward the subject moved by the scanning table section 4 in the backward direction BD opposite to the forward direction FD and X-rays passing through the subject are detected. The scan gantry 2 thus performs the forward scan and backward scan repeatedly according to the scan plan.

In particular, as shown in FIG. 6, a forward scan is performed while moving the cradle 401 along the forward direction FD from a forward-movement start position Cs1 to a forward-movement end position Ce1 in the direction 'z' of the body axis of the subject laid on the cradle 401. A first set of projection data is thus acquired as projection data. At that time, by performing the scan as the cradle 401 is being moved in the forward direction FD, a first set of a plurality of projection data elements, which are to be acquired as projection data, are acquired in association with respective cradle positions during the movement of the cradle 401 in the forward direction FD.

Thereafter, as shown in FIG. 6, a backward scan is performed while moving the cradle 401 along the backward direction BD from a backward-movement start position Cs2 to a backward-movement end position Ce2 in the direction 'z' of the body axis of the subject laid on the cradle 401. In the present embodiment, as shown in FIG. 6, the backward scan is performed from the forward-movement end position Ce1 to the forward-movement start position Cs1 along which the cradle 401 is moved in the forward scan. A second set of projection data is thus acquired as projection data. At that time, by performing the scan as the cradle 401 is being moved in the backward direction BD, a second set of a plurality of projection data elements, which are to be acquired as projection data, are acquired in association with respective cradle positions during the movement of the cradle 401 in the backward direction BD.

Figure 7:
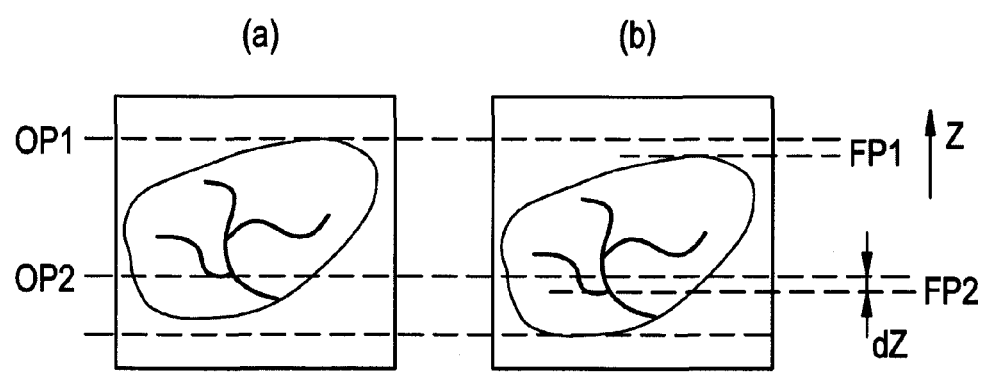
FIGS. 7(a) and 7(b) are diagrams showing the positional relationship between a portion in the subject laid on the cradle 401 moved in a forward direction FD and the portion in the subject laid on the cradle 401 moved in a backward direction BD in Embodiment 1 in accordance with the present invention.

FIG. 7 is a diagram showing the positional relationship between a portion in the subject laid on the cradle 401 moved in the forward direction FD and the portion in the subject laid on the cradle 401 moved in the backward direction BD in Embodiment 1 in accordance with the present invention. In FIG. 7, a plane along the direction 'z' of the body axis of the subject laid on the cradle 401 is shown, where FIG. 7(a) shows the movement in the forward direction FD, an FIG. 7(b) shows the movement in the backward direction BD.

As shown in FIGS. 7(a) and 7(b), the position of the subject (for example, OP1, OP2) moved as the cradle 401 is being moved in the forward direction FD, and the position of the subject (for example, FP1, FP2) moved as the cradle 401 is being moved in the backward direction BD opposite to the forward direction FD are sometimes different to cause tissue such as an organ within the subject to lie at different positions in the body axis direction 'z' between the forward direction FD and backward direction BD, for example, as shown in FIG. 7, even if an attempt is made to move the cradle 401 to lie at the same position between movement in the forward direction FD and in the backward direction BD, because a force is applied to the subject along the body axis direction 'z' in which the cradle 401 is moved and the subject may be shifted relative to the cradle 401.

That is, even if cradle positions associated with the plurality of first sets of projection data acquired as the cradle 401 is being moved in the forward direction FD, and those associated with the plurality of second sets of projection data as the cradle 401 is being moved in the backward direction BD are mutually the same (see FIG. 6), the positions are different from each other relative to the scan gantry 2 in the direction 'z' of the body axis of the subject, resulting in a positional offset occurring with certain amount of positional offset 'dz' with reference to the subject, as shown in FIG. 7.

Next, image reconstruction is performed, as shown in FIG. 5 (S31).

At this step, the image reconstructing section 303 image-reconstructs a slice image for the region to be imaged in the subject as a digital image consisting of a plurality of pixels based on the projection data collected by the data collecting section 24 by performing the aforementioned scan.

In the present embodiment, a forward-path image for the region to be imaged in the subject is image-reconstructed based on the first set of projection data obtained in the forward scan, and a backward-path image for the region to be imaged in the subject is image-reconstructed based on the second set of projection data obtained in the backward scan.

The forward-path image and backward-path image are produced here based on the amount of positional offset 'dz' acquired by the amount-of-positional-offset acquiring section 304 such that respective pixel positions in the forward-path image and backward-path image lie at positions corresponding to each other in the direction along the forward direction and backward direction.

Figure 8:
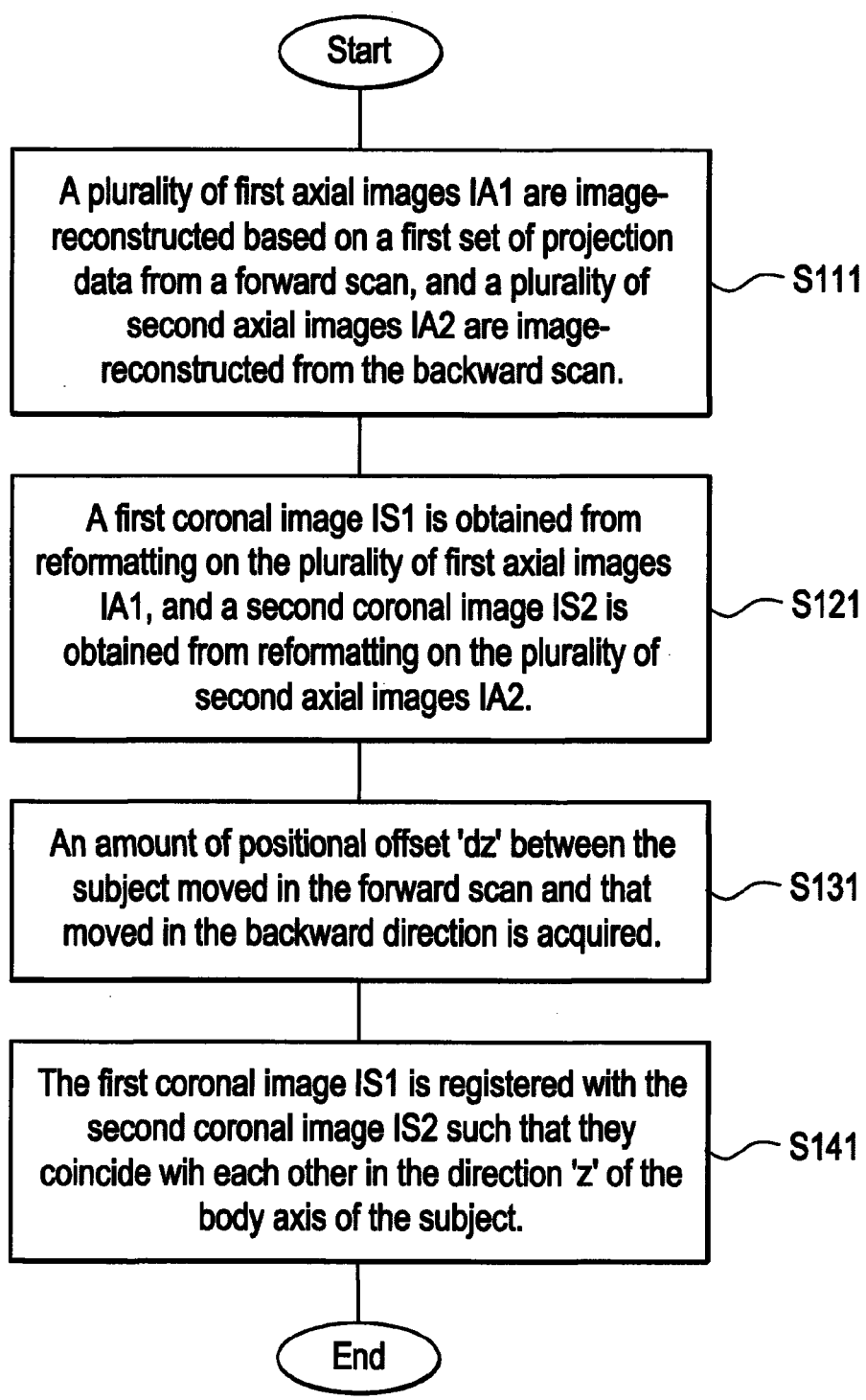
FIG. 8 is a flow chart showing an operation of producing a forward-path image and a backward-path image in Embodiment 1 in accordance with the present invention.
Figure 9:
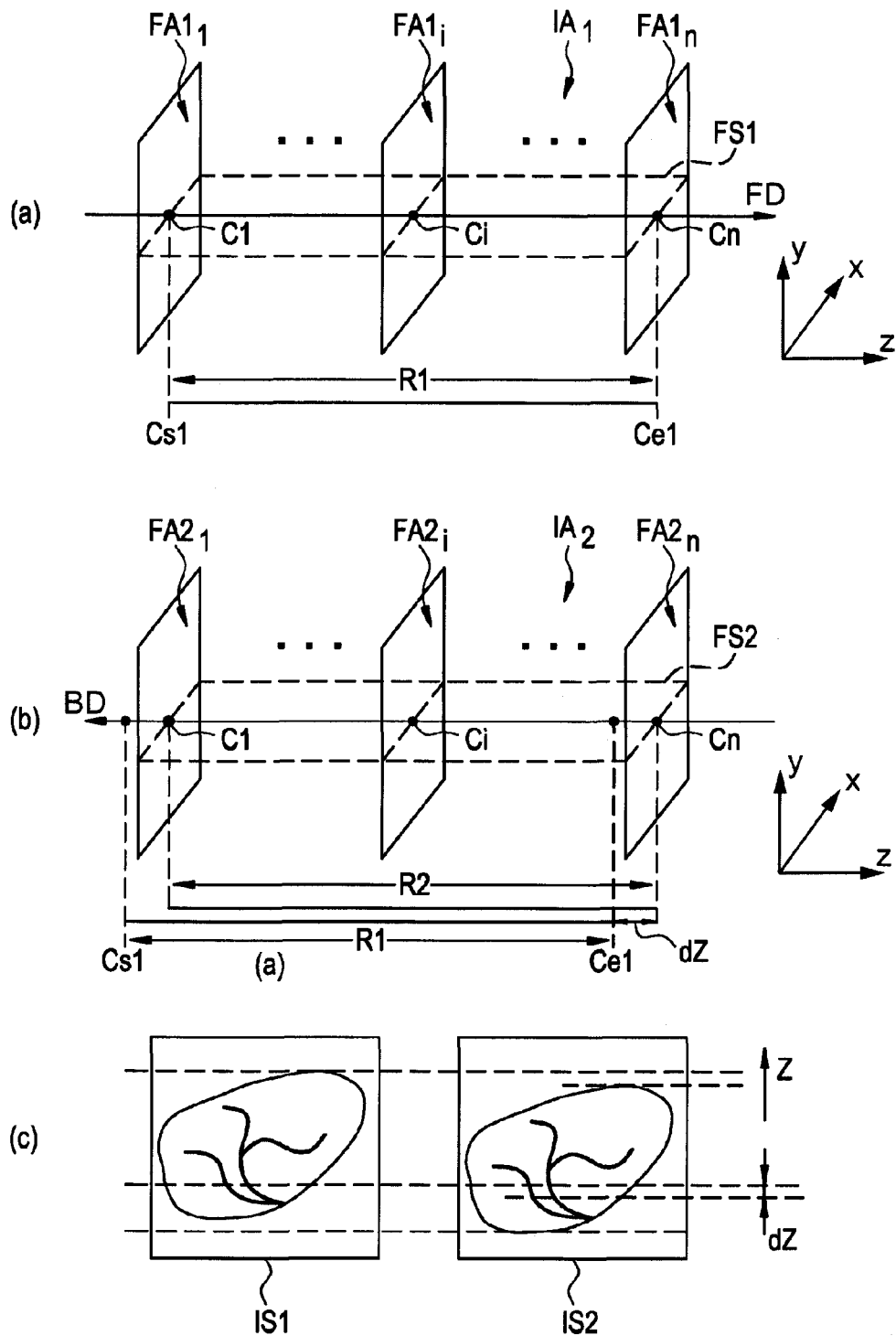
FIGS. 9(a), 9(b), and 9(c) are diagrams showing the forward-path image and backward-path image produced in a region to be imaged in the subject in Embodiment 1 in accordance with the present invention.
Figure 10:
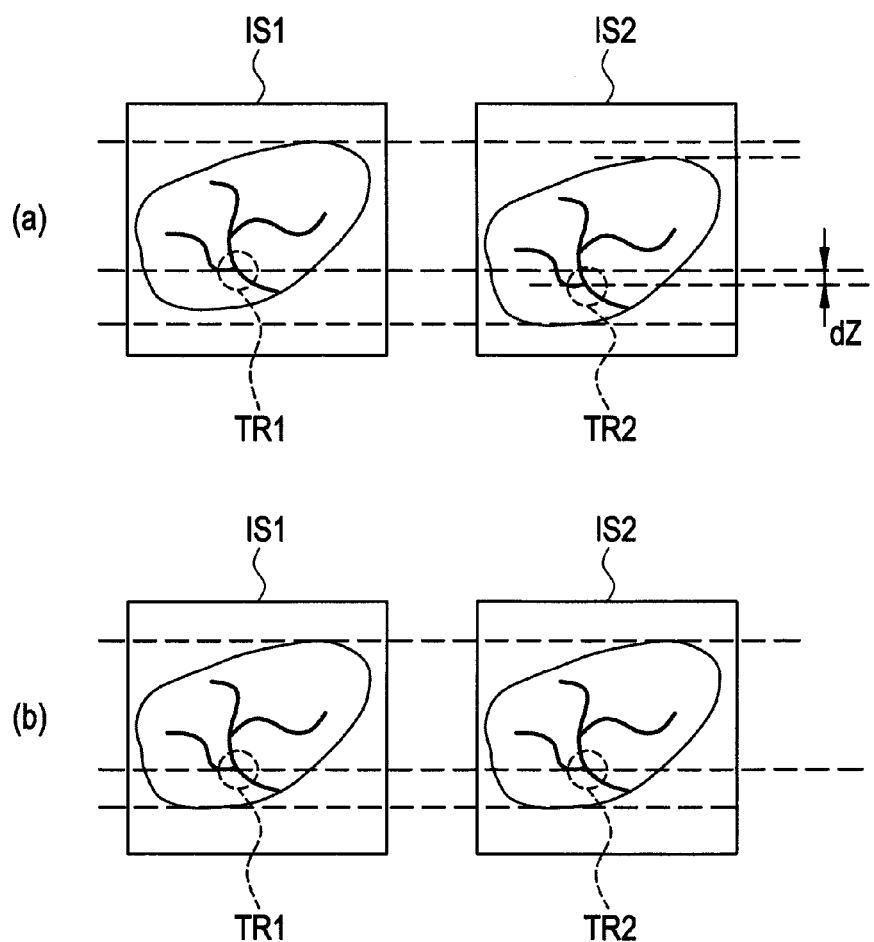
FIGS. 10(a) and 10(b) are diagrams showing the forward-path image and backward-path image produced in a region to be imaged in the subject in Embodiment 1 in accordance with the present invention.

FIG. 8 is a flow chart showing an operation of producing a forward-path image and a backward-path image in Embodiment 1 in accordance with the present invention. FIGS. 9 and 10 show production of the forward-path image and backward-path image in a region to be imaged in the subject in Embodiment 1 in accordance with the present invention.

In producing a forward-path image and a backward-path image, first, a plurality of first axial images IA1 are image-reconstructed based on the first set of projection data from a forward scan, and a plurality of second axial images IA2 are image-reconstructed from the backward scan, as shown in FIG. 8 (S111).

At this step, the plurality of first axial images IA1 are image-reconstructed for a plurality of axial planes xy having a perpendicular lying in the body axis direction 'z' in which the cradle 401 is moved in the forward direction FD based on the first set of projection data obtained in the forward scan, the axial planes $FA1_1, \ldots, FA1_i, \ldots, FA1_n$ being respectively corresponding to a plurality of cradle positions C1, ..., Ci, ..., Cn lined up at regular intervals from a first cradle position C1 to an n-th cradle position Cn, as shown in FIG. 9(a). For example, the plurality of first axial images IA1 are produced to be arranged at intervals of 0.625 mm. That is, the plurality of first axial images IA1 are image-reconstructed for a region to be imaged R1 in the subject moved along the forward direction FD from the forward-movement start position Cs1 to the forward-movement end position Ce1 in the direction 'z' of the body axis of the subject laid on the cradle 401.

Moreover, the plurality of second axial images IA2 are image-reconstructed for a plurality of axial planes xy having a perpendicular lying in the body axis direction 'z' based on the second set of projection data obtained in the backward scan, the axial planes FA21, ..., FA2i, ..., FA2n being respectively corresponding to the cradle positions C1, ..., Ci, ..., Cn at which the first axial images A1 are produced from the first cradle position C1 to the n-th cradle position Cn, as shown in FIG. 9(b). At that time, when the backward scan is performed as the cradle 401 is being moved along the forward direction FD from the n-th cradle position Cn to the first cradle position C1 in the direction 'z' of the body axis of the subject laid on the cradle 401, a positional offset occurs with certain amount of positional offset 'dz' in the body axis direction 'z,' as described earlier with reference to FIG. 7. Thus, the scan is performed for a second region to be imaged R2 shifted by the positional offset from the first region to be imaged R1 on which the forward scan has been performed in the subject, as shown in FIG. 9(b). Therefore, in performing the backward scan, the plurality of second axial images IA2 are actually image-reconstructed for axial planes FA21, ..., FA2i, ..., FA2n offset from the axial planes FA11, ..., FA1i, ..., FA1n at which the first axial images IA1 are produced, by a certain amount of positional offset 'dz' in the body axis direction 'z.'

Next, as shown in FIG. 8, a first coronal image IS1 is obtained from reformatting on the plurality of first axial images IA1, and a second coronal image IS2 is obtained from reformatting on the plurality of second axial images IA2 (S121).

At this step, the first coronal image IS1 is obtained from reformatting by performing reformatting processing on the plurality of first axial images IA1. The second coronal image IS2 is obtained from reformatting by performing reformatting processing on the plurality of second axial images IA2.

In particular, as shown in FIG. 9(a), MPR (Multi-Planar Reformatting) processing is performed as the reformatting processing for a coronal plane FS1 that is a plane xz along the body axis direction 'z' in which the cradle 401 is moved in the forward direction FD, to thereby produce the first coronal image IS1 as shown in FIG. 9(c).

Moreover, as shown in FIG. 9(b), MPR processing is performed as the reformatting processing for a coronal plane FS2 corresponding to the coronal plane FS1 that is a plane xz along the body axis direction 'z' in which the cradle 401 is moved in the backward direction BD, and for which plane FS1 the first coronal image IS1 is obtained from reformatting, to thereby produce the second coronal image IS2 in the body axis direction 'z' in which the cradle 401 is moved in the backward direction BD, as shown in FIG. 9(c).

At that time, as shown in FIG. 9(c), the first coronal image IS1 and second coronal image IS2 have respective pixel positions, which correspond to tissue such as an organ within the subject, offset relative to each other by a certain amount of positional offset 'dz', because the positional offset occurs in the body axis direction 'z.'

Next, as shown in FIG. 8, the amount of positional offset 'dz' between the subject moved in the forward scan and that moved in the backward direction is acquired (S131).

At this step, the amount-of-positional-offset acquiring section 304 acquires the amount of positional offset 'dz' that represents a difference in the body axis direction 'z' along the forward direction FD and backward direction BD between a first subject position and a second subject position, the first subject position being a position to which the region to be imaged in the subject laid on the moving cradle 401 is moved when the cradle 401 is moved in the forward direction FD in the scanning table section 4, and the second subject position being a position to which the region to be imaged in the subject laid on the moving cradle 401 is moved when the cradle 401 is moved in the backward direction BD such that the region to be imaged in the subject coincides with the first subject position.

In the present embodiment, the amount-of-positional-offset acquiring section 304 calculates the amount of positional offset 'dz' by applying comparison processing to the first coronal image IS1 and second coronal image IS2 image-reconstructed by the image reconstructing section 303.

At that time, as shown in FIG. 10(a), the amount of positional offset 'dz' is calculated based on a pixel position of a first feature-extracted region TR1 extracted by performing feature extraction processing on the first image-reconstructed coronal image IS1, and a pixel position of a second feature-extracted region TR2 extracted to match the first feature-extracted region TR1 extracted in the first coronal image IS1 by performing feature extraction processing on the second image-reconstructed coronal image IS2.

In particular, as shown in FIG. 10(a), the first feature-extracted region TR1 is initially extracted by performing feature extraction processing on the first coronal image IS1 to extract a portion at which blood vessels intersect in tissue within the subject as a feature portion, for example. Likewise, the second feature-extracted region TR2 is extracted to match the first feature-extracted region TR1 extracted in the first coronal image IS1 by performing feature extraction processing on the second coronal image IS2.

The amount of positional offset 'dz' is then calculated as a distance representing a difference in the body axis direction 'z' between the pixel position of the first feature-extracted region TR1 extracted in the first coronal image IS1 and the pixel position of the second feature-extracted region TR2 extracted to match the first feature-extracted region TR1 in the second coronal image IS2.

Next, as shown in FIG. 8, the first coronal image IS1 is registered with the second coronal image IS2 such that they coincide with each other in the direction 'z' of the body axis of the subject (S141).

At this step, a pixel position in at least one of the first coronal image IS1 and second coronal image IS2 is shifted for correction based on the amount of positional offset 'dz' acquired by the amount-of-positional-offset acquiring section 304 such that respective pixel positions in the first coronal image IS1 and second coronal image IS2 lie at positions corresponding to each other in the region to be imaged in the body axis direction 'z' along the forward direction FD and backward direction BD. Then, the first coronal image IS1 and second coronal image IS2 after this correction are produced as the forward-path image and backward-path image, respectively.

In particular, as shown in FIG. 10(b), pixel positions in the second coronal image IS2 are shifted relative to those in the first coronal image IS1 in the body axis direction 'z,' for example, according to the amount of positional offset 'dz' calculated as described above. Then, the first coronal image IS1 and second coronal image IS2 having shifted pixel positions are produced as the forward-path image and backward-path image, respectively.

The display device 51 then displays on its display screen the thus-produced forward-path image and backward-path image for diagnosis.

As described above, according to the present embodiment, the amount-of-positional-offset acquiring section 304 acquires an amount of positional offset 'dz' that represents a difference in the body axis direction 'z' along the forward direction FD and backward direction BD between a first subject position and a second subject position, the first subject position being a position to which the region to be imaged in the subject laid on the moving cradle 401 is moved when the cradle 401 is moved in the forward direction FD in the scanning table section 4, and the second subject position being a position to which the region to be imaged in the subject laid on the moving cradle 401 is moved when the cradle 401 is moved in the backward direction BD such that the region to be imaged in the subject coincides with the first subject position. Then, the forward-path image and backward-path image are corrected based on the amount of positional offset 'dz' acquired by the amount-of-positional-offset acquiring section 304 such that respective pixel positions in the forward-path image and backward-path image lie at positions corresponding to each other in the body axis direction 'z' along the forward direction FD and backward direction BD. Thus, according to the present embodiment, a slice image can be reconstructed for a slice plane lying at the same position in the subject both in the forward direction FD and backward direction; therefore, improvement of image quality and efficiency in diagnosis can be easily achieved.

Moreover, according to the present embodiment, a first coronal image IS1 is image-reconstructed based on a first set of projection data, a second coronal image IS2 is image-reconstructed based on a second set of projection data, and comparison processing is applied to the first coronal image IS1 and second coronal image IS2 image-reconstructed to thereby calculate the amount of positional offset. At that time, a plurality of first axial images IA1 are image-reconstructed for a plurality of axial planes having a perpendicular lying in the body axis direction 'z' in which the cradle 401 is moved in the forward direction FD and backward direction BD based on the first set of projection data acquired in a forward scan, and thereafter, the image-reconstructed plurality of first axial images IA1 are reformatted to thereby image-reconstruct the first coronal image IS1. Moreover, a plurality of second axial images IA2 are image-reconstructed for a plurality of axial planes having a perpendicular in the body axis direction 'z' for the cradle 401 based on the second set of projection data obtained in a backward scan, and thereafter, the image-reconstructed plurality of second axial images IA2 are reformatted to thereby image-reconstruct the second coronal image IS2. Thereafter, the amount of positional offset is calculated based on a pixel position of a first feature-extracted region TR1 extracted by performing feature extraction processing on the first coronal image IS1 and a pixel position of a second feature-extracted region TR2 extracted to match the first feature-extracted region TR1 extracted in the first coronal image IS1 by performing feature extraction processing on the second coronal image IS2. Then, a pixel position in at least one of the first coronal image IS1 and second coronal image IS2 is shifted for correction based on the automatically calculated amount of positional offset as described above such that respective pixel positions in the first coronal image IS1 and second coronal image IS2 lie at positions corresponding to each other in the region to be imaged in the subject in the body axis direction 'z' along the forward direction FD and backward direction BD. Then, the first coronal image IS1 and second coronal image IS2 are produced as the forward-path image and backward-path image, respectively. According to the present embodiment, an amount of positional offset that occurs during movement in the forward direction FD and backward direction is thus automatically measured, and thereafter, slice images can be corrected for slice planes lying at the same position in the subject in both the forward direction FD and backward direction based on the measured amount of positional offset; therefore, improvement of image quality and efficiency in diagnosis can be easily achieved.

Embodiment 2

Now Embodiment 2 in accordance with the present invention will be described.

The present embodiment is different from Embodiment 1 in the step of acquiring an amount of positional offset between the subject moved in a forward scan and that moved in a backward scan (Step S131 in Embodiment 1 shown in FIG. 8). Beside this point, the present embodiment is similar to Embodiment 1. Accordingly, redundant portions are omitted in the explanation.

Figure 11:
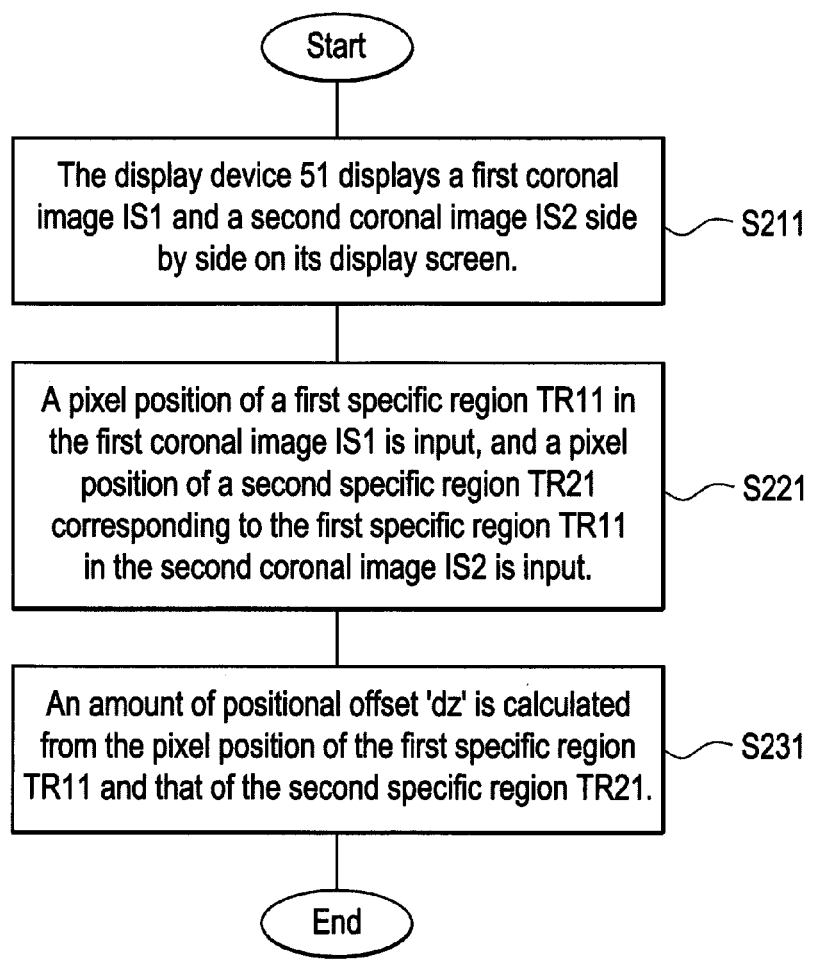
FIG. 11 is a flow chart showing an operation of acquiring an amount of positional offset between the subject moved in a forward scan and that moved in a backward scan in Embodiment 2 in accordance with the present invention.
Figure 12:
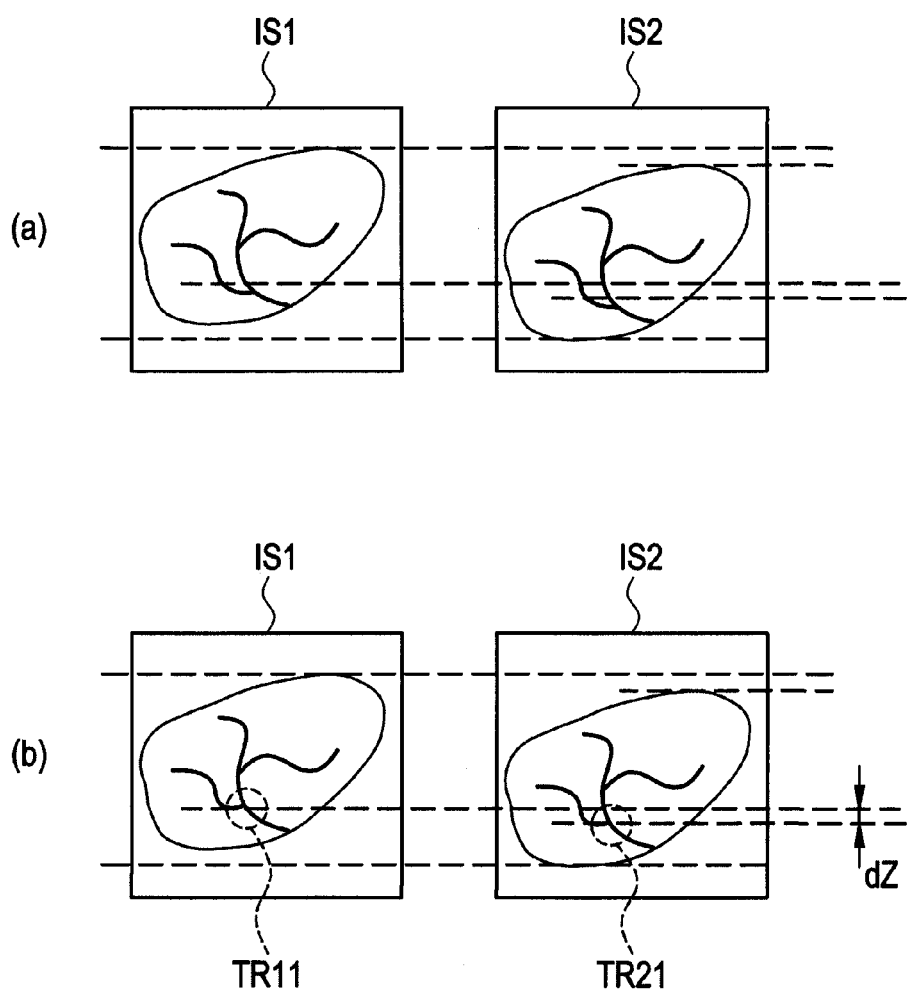
FIGS. 12(a) and 12(b) are diagrams showing the amount of positional offset acquired between the subject moved in the forward scan and that moved in the backward scan in Embodiment 2 in accordance with the present invention.

FIG. 11 is a flow chart showing an operation of acquiring an amount of positional offset between the subject moved in a forward scan and that moved in a backward scan in Embodiment 2 in accordance with the present invention. FIG. 12 is a diagram showing the amount of positional offset acquired between the subject moved in the forward scan and that moved in the backward scan in Embodiment 2 in accordance with the present invention.

In acquiring an amount of positional offset between the subject moved in a forward scan and that moved in a backward scan, the display device 51 displays a first coronal image IS1 and a second coronal image IS2 side by side on its display screen, as shown in FIG. 11 (S211).

At this step, as shown in FIG. 12(a), the display device 51 displays the first coronal image IS1 and second coronal image IS2 that are obtained by reformatting as in Embodiment 1 side by side on its display screen.

Next, as shown in FIG. 11, a pixel position of a first specific region TR11 in the first coronal image IS1 is input, and a pixel position of a second specific region TR21, corresponding to the first specific region TR11, in the second coronal image IS2 is input (S221).

At this step, as shown in FIG. 12(b), the operator views the first coronal image IS1 displayed on the display screen of the display device 51, and inputs using a pointing device in the input device 41 the pixel position of the first specific region TR11 in the first coronal image IS1. The display device 51 then displays on its display screen the first coronal image IS1 superimposed with a first marker image M1 to indicate the input pixel position of the first specific region TR11. For example, a pixel position of a portion at which blood vessels intersect in tissue within the subject is input as the first specific region TR11. Likewise, the operator thereafter views the second coronal image IS2 displayed on the display screen of the display device 51, and inputs using the pointing device in the input device 41 the pixel position of a region in the second coronal image IS2, corresponding to the first specific region TR11 input in the first coronal image IS1, as the second specific region TR21. The display device 51 then displays on its display screen the second coronal image IS2 superimposed with a second marker image M2 to indicate the input pixel position in the second specific region TR21.

Next, an amount of positional offset 'dz' is calculated from the pixel position of the first specific region TR11 and that of the second specific region TR21 (S231).

At this step, the amount-of-positional-offset acquiring section 304 calculates an amount of positional offset 'dz' based on the pixel position of the first specific region TR11 and that of the second specific region TR21 input via the input device 41. In particular, as shown in FIG. 12(b), the amount of positional offset 'dz' is calculated as a distance representing a difference in the body axis direction 'z' between the pixel position of the first specific region TR11 input in the first coronal image IS1 and that of the second specific region TR21 input in the second coronal image IS2 to correspond to the first specific region TR11.

Thereafter, the first coronal image IS1 is registered with the second coronal image IS2 such that they coincide with each other in the direction 'z' of the body axis of the subject, as in Embodiment 1 (S141 in FIG. 8).

As described above, according to the present embodiment, the display device 41 displays on its display screen a first coronal image IS1 obtained in a forward scan and a second coronal image IS2 obtained in a backward scan. Then, a pixel position of a first specific region TR11 in the first coronal image IS1 is input via the input device, and a pixel position of a second specific region TR21 in the second coronal image IS2 corresponding to the first specific region TR11 is input via the input device 41 by the operator viewing the first coronal image IS1 and second coronal image IS2 displayed on the display screen. Thereafter, the amount-of-positional-offset acquiring section 304 calculates an amount of positional offset 'dz' based on the pixel position of the first specific region TR11 and that of the second specific region TR21 input via the input device 41. As in Embodiment 1, respective pixel positions in the first coronal image IS1 serving as the forward-path image and in the second coronal image IS2 serving as the backward-path image are corrected based on the amount of positional offset 'dz' acquired by the amount-of-positional-offset acquiring section 304 such that they lie at positions corresponding to each other in the body axis direction 'z' along the forward direction FD and backward direction BD. Thus, according to the present embodiment, slice images can be reconstructed for slice planes lying at the same position in the subject both in the forward direction FD and backward direction, as in Embodiment 1; therefore, improvement of image quality and efficiency in diagnosis can be easily achieved.

Embodiment 3

Now Embodiment 3 in accordance with the present invention will be described.

The present embodiment is different from Embodiment 1 in the step of acquiring an amount of positional offset between the subject moved in a forward scan and that moved in a backward scan (Step S131 in Embodiment 1 shown in FIG. 8). Beside this point, the present embodiment is similar to Embodiment 1. Accordingly, redundant portions are omitted in the explanation.

Figure 13:
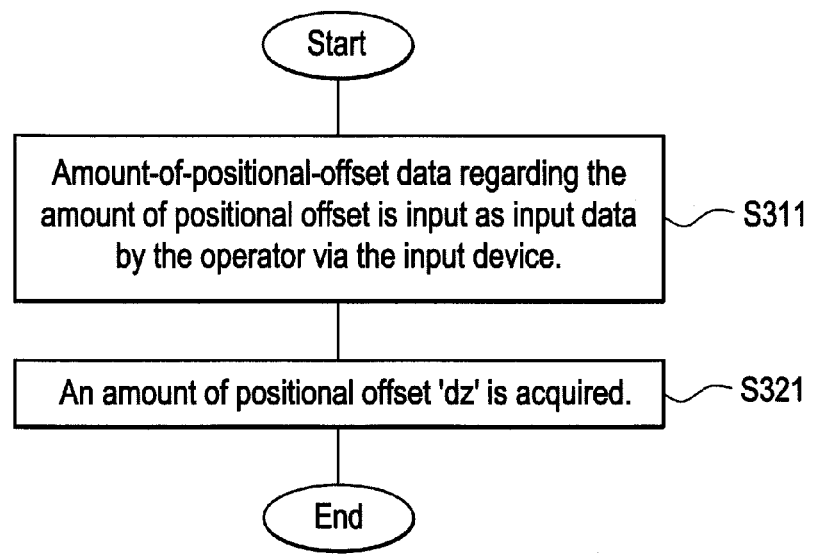
FIG. 13 is a flow chart showing an operation of acquiring an amount of positional offset between the subject moved in the forward scan and that moved in the backward scan in Embodiment 3 in accordance with the present invention.

FIG. 13 is a flow chart showing an operation of acquiring an amount of positional offset between the subject moved in a forward scan and that moved in a backward scan in Embodiment 3 in accordance with the present invention.

In acquiring an amount of positional offset between the subject moved in a forward scan and that moved in a backward scan, amount-of-positional-offset data regarding the amount of positional offset is input as input data by the operator via the input device, as shown in FIG. 13 (S311).

At this step, amount-of-positional-offset data regarding the amount of positional offset measured by the operator beforehand, for example, is input.

Next, an amount of positional offset 'dz' is acquired (S321).

At this step, the amount-of-positional-offset data input via the input device 41 as described above is received by the amount-of-positional-offset acquiring section 304 to acquire the data as the amount of positional offset 'dz.'

Thereafter, the first coronal image IS1 is registered with the second coronal image IS2 such that they coincide with each other in the direction 'z' of the body axis of the subject, as in Embodiment 1 (S141 in FIG. 8).

As described above, according to the present embodiment, amount-of-positional-offset data regarding the amount of positional offset is input as input data by the operator via the input device, and the amount-of-positional-offset acquiring section 304 acquires an amount of positional offset 'dz' based on the amount-of-positional-offset data input via the input device 41. As in Embodiment 1, respective pixel positions in the first coronal image IS1 serving as the forward-path image and in the second coronal image IS2 serving as the backward-path image are corrected based on the amount of positional offset 'dz' acquired by the amount-of-positional-offset acquiring section 304 such that they lie at positions corresponding to each other in the body axis direction 'z' along the forward direction FD and backward direction BD. Thus, according to the present embodiment, slice images can be reconstructed for slice planes lying at the same position in the subject both in the forward direction FD and backward direction, as in Embodiment 1; therefore, improvement of image quality and efficiency in diagnosis can be easily achieved.

Embodiment 4

Now Embodiment 4 in accordance with the present invention will be described.

In the present embodiment, a plurality of axial images are image-reconstructed such that forward-path images and backward-path images are alternately arranged in positions different from each other in the region to be imaged in the subject in the body axis direction 'z' in which the cradle 401 is moved in the forward direction FD and backward direction. The display device 51 then sequentially displays the forward-path images and backward-path images alternately as a moving picture on the display screen along the body axis direction 'z' in which the cradle 401 is moved in the forward direction FD and backward direction. Beside this point, the present embodiment is similar to Embodiment 1. Accordingly, redundant portions are omitted in the explanation.

Figure 14:
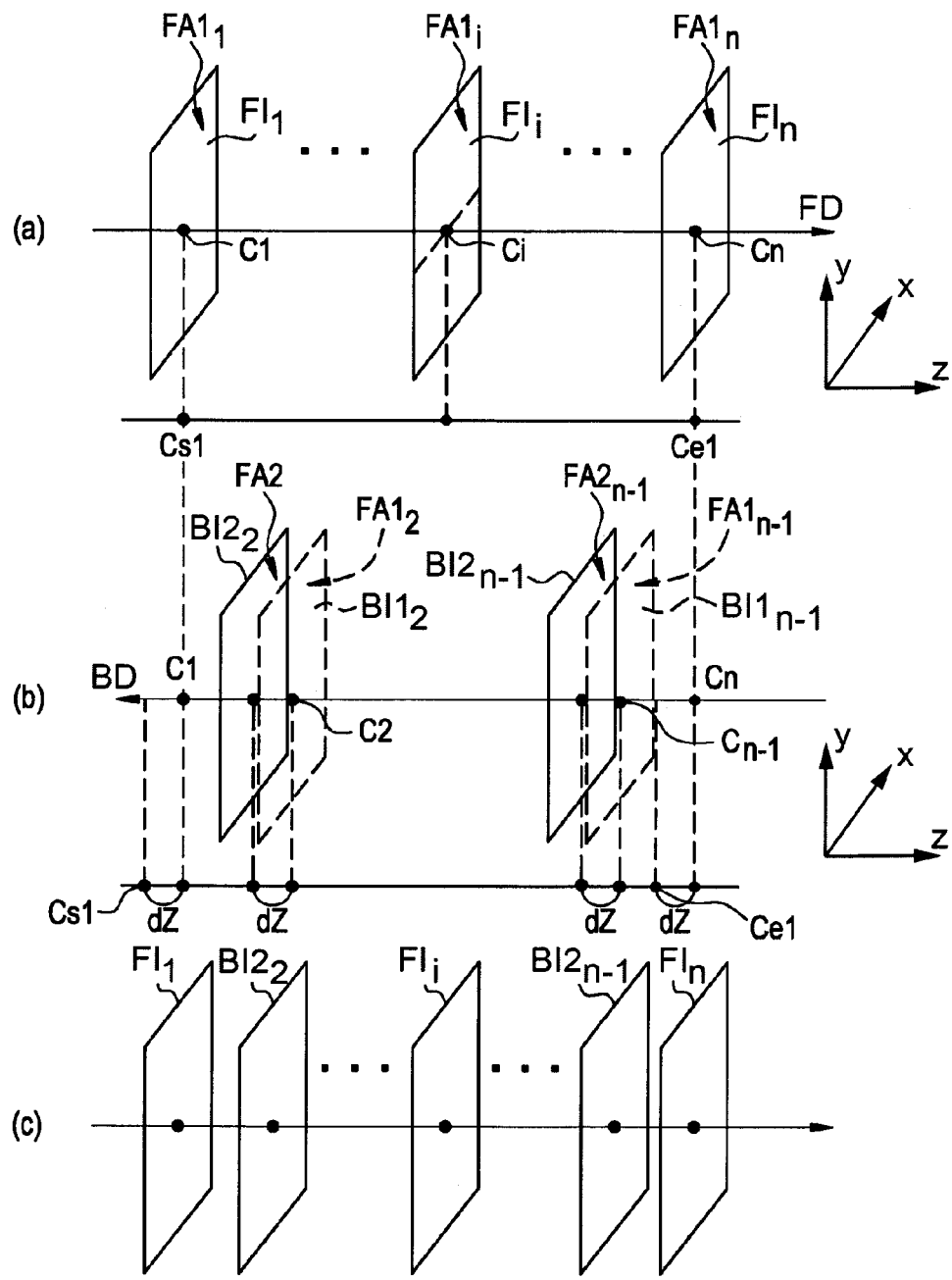
FIGS. 14(a), 14(b), and 14(c) are diagrams showing forward-path images and backward-path images produced in Embodiment 4 in accordance with the present invention.

FIG. 14 is a diagram showing forward-path images and backward-path images produced in Embodiment 4 in accordance with the present invention.

In producing forward-path images, as shown in FIG. 14(a), a plurality of forward-path images $FI_1, \ldots, FI_i, \ldots, FI_n$ are image-reconstructed for a plurality of axial planes having a perpendicular lying in the body axis direction 'z' in which the cradle 401 is moved in the forward direction FD and backward direction BD based on a first set of projection data obtained in a forward scan.

At that time, as shown in FIG. 14(a), the plurality of forward-path images $FI_1, \ldots, FI_i, \ldots, FI_n$ are image-reconstructed for a plurality of axial planes $FA1_i, \ldots, FA1_i, \ldots, FA1_n$ corresponding to a plane xy having a perpendicular lying in the body axis direction 'z,' the axial planes $FA1_i, \ldots, FA1_i, \ldots, FA1_n$ respectively corresponding to odd-numbered ones of cradle positions $C_1, \ldots, C_i, \ldots, C_n$ lined up at regular intervals from a first cradle position $C_1$ to an n-th cradle position $C_n$.

In producing backward-path images, as shown in FIG. 14(b), a plurality of backward-path images $BI1_2, \ldots, BI_{i-1}, \ldots, BI1_{n-1}$ are image-reconstructed for a plurality of axial planes corresponding to a plane xy having a perpendicular lying in the body axis direction 'z' in which the cradle 401 is moved in the forward direction FD and backward direction based on a second set of projection data obtained in a backward scan.

At that time, to make a moving picture containing the forward-path images and backward-path images in combination, as shown in FIG. 14(b), and unlike Embodiment 1, the plurality of backward-path images $BI1_2, \ldots, BI_{i-1}, \ldots, BI1_{n-1}$ are image-reconstructed such that the forward-path images $FI_1, \ldots, FI_i, \ldots, FI_n$ and backward-path images $BI1_2, \ldots, BI1_{n-1}$ are alternately arranged at positions different from each other in the body axis direction 'z' in which the cradle 401 is moved in the forward direction FD and backward direction. That is, as shown in FIG. 14(b), the plurality of backward-path images $BI1_2, \ldots, BI1_{n-1}$ are image-reconstructed for a plurality of planes xy having a perpendicular in the body axis direction 'z', the axial planes $FA1_2, \ldots, FA1_{n-1}$ respectively corresponding to even-numbered ones of cradle positions $C_1, \ldots, C_i, \ldots, C_n$ lined up at regular intervals from the first cradle position $C_1$ to the n-th cradle position $C_n$.

While in this case, as shown in FIGS. 14(a) and (b), the plurality of forward-path images $FI_1, \ldots, FI_i, \ldots, FI_n$ and plurality of backward-path images $BI1_2, \ldots, BI1_{i-1}, \ldots, BI1_{n-1}$ are alternately image-reconstructed such that they correspond to cradle positions lined up at regular intervals from the first cradle position $C_1$ to the n-th cradle position $C_n$, the relative positional relationship between the plurality of forward-path images $FI_1, \ldots, FI_i, \ldots, FI_n$ and plurality of backward-path images $BI1_2, \ldots, BI1_{i-1}, \ldots, BI1_{n-1}$ does not correspond to the cradle positions $C_1, C_2, \ldots, C_i, \ldots, C_{n-1}, C_n$ lined up at regular intervals from the first cradle position $C_1$ to the n-th cradle position $C_n$ in practice, as shown in FIGS. 14(a) and (b), because of a positional offset in the direction 'z' of the body axis of the subject between the forward scan and backward scan as described earlier with reference to FIG. 7. Thus, as discussed earlier, when the forward-path images $FI_1, \ldots, FI_i, \ldots, F_n$ and backward-path images $BI1_2, \ldots, BI1_{i-1}, \ldots, BI1_{n-1}$ are sequentially displayed alternately as a moving picture on the display screen along the body axis direction 'z', tissue such as an organ within the subject may be displayed to be fluctuating as if it were pulsating.

Accordingly, in the present embodiment, the forward-path images $FI_1, \ldots, FI_i, \ldots, F_n$ and backward-path images $BI1_2, \ldots, BI1_{i-1}, \ldots, BI1_{n-1}$ are registered such that they correspond to respective positions in the region to be imaged in the subject in the body axis direction 'z' based on the amount of positional offset 'dz' acquired by the amount-of-positional-offset acquiring section 304 according to Embodiment 1 etc.

For example, as indicated in a solid line in FIG. 14(b), a plurality of axial images are image-reconstructed based on a second set of projection data for axial planes $FA2_2, FA2_{i-1}, \ldots, FA2_{n-1}$ that are planes shifted from the axial planes $FA1_2, FA1_{i-1}, \ldots, FA1_{n-1}$ for which the backward-path images $BI1_2, \ldots, BI1_{i-1}, \ldots, BI1_{n-1}$ are image-reconstructed as described above, corresponding to the amount of positional offset 'dz' in the body axis direction 'z,' and the plurality of axial images are produced as backward-path images $BI2_2, BI2_{i-1}, BI2_{n-1}$. For example, the images are produced by applying data processing such as interpolation processing.

Then, as shown in FIG. 14(c), the display device 51 displays on its display screen the registered forward-path images $FI_1, \ldots, FI_i, \ldots, FI_n$ and backward-path image $BI2_2, \ldots, BI2_{i-1}, \ldots, BI2_{n-1}$ as a moving picture having these images as frames alternately arranged along the body axis direction 'z.'

That is, as shown in FIG. 14(c), the images are alternately and consecutively displayed in a sequence such as forward-path image $FI_1$, backward-path image $BI2_2, \ldots$, backward-path image $BI2_{i-1}$, forward-path image $FI_i, \ldots$, backward-path image $BI2_{n-1}$, and forward-path image $FI_n$.

As described above, in the present embodiment, forward-path images $FI_1, \ldots, FI_i, \ldots, FI_n$ and backward-path images $BI1_2, \ldots, BI1_{n-1}$ are registered such that they correspond to respective positions in the region to be imaged in the subject in the body axis direction 'z' based on the amount of positional offset 'dz' acquired by the amount-of-positional-offset acquiring section 304. Then, the registered forward-path images $FI_1, \ldots, FI_i, \ldots, FI_n$ and backward-path images $BI2_2, \ldots, BI2_{n-1}$ are displayed as a moving picture having these images as frames alternately arranged along the body axis direction 'z.' Thus, in the present embodiment, the forward-path images $FI_1, \ldots, FI_i, \ldots, FI_n$ and backward-path images $BI1_2, \ldots, BI1_{n-1}$ are image-reconstructed after registering them with one another to correspond to a reference position in the subject; therefore, when they are consecutively and sequentially displayed as frames in a moving picture, an organ or the like within the subject is prevented from being displayed to be fluctuating as if it were pulsating. Therefore, the present embodiment can easily achieve improvement of image quality to improve efficiency in diagnosis.

It should be noted that in the aforementioned embodiments, the X-ray CT apparatus 1 corresponds to the radiography apparatus in accordance with the present invention. In the aforementioned embodiments, the scan gantry 2 corresponds to the scanning section of the present invention. In the aforementioned embodiments, the display device 51 corresponds to the display section of the present invention.

Moreover, in practicing the present invention, it is not limited to the aforementioned embodiments and several variations may be employed.

For example, the aforementioned embodiments address a case in which X-rays are used as radiation; however the present invention is not limited thereto. Radiation such as gamma-rays may be employed, for example.

Moreover, the aforementioned embodiments address a case in which a scan is performed in a helical shuttle scan scheme; however the present invention is not limited thereto. The present invention may be applied to a case in which a scan is performed in an axial shuttle scan scheme, for example.

Furthermore, the aforementioned embodiments address a case in which forward-path images and backward-path images are produced in a coronal plane and in an axial plane; however the present invention is not limited thereto. The present invention may be applied to a case in which the images are produced in a sagittal plane or in an oblique plane, for example.

In addition, although the aforementioned embodiments address a case in which the amount of positional offset 'dz' is automatically measured for a subject between a forward scan and a backward scan from images produced by MPR processing, the amount may be measured using images such as those produced by MIP processing, or a three-dimensional image.

The invention claimed is:

1. A radiography apparatus comprising:
a scanning table section comprising a cradle on which a subject is laid;

a scanning section configured to perform a scan by emitting radiation toward a region of the subject to be imaged and detect radiation passing through the region to be imaged to acquire projection data; and a data processing section configured to reconstruct an image of the region based on the projection data acquired by said scanning section, said scanning table section configured to move the cradle in a forward direction and in a backward direction relative to said scanning section, said scanning section configured to perform a scan as the cradle is being moved in said forward direction to acquire a first set of projection data, and perform a scan as the cradle is being moved in said backward direction to acquire a second set of projection data, and wherein said data processing section is configured to reconstruct a forward-path image based on said first set of projection data, and reconstruct a backward-path image based on said second set of projection data, wherein said data processing section comprises:

a positional offset determining section configured to determine a positional offset that represents a distance in a direction along said forward direction and said backward direction between a first subject position and a second subject position, said first subject position being a position at which the region to be imaged is scanned when the cradle is moved in said forward direction, and said second subject position being a position at which the region to be imaged is scanned when the cradle is moved in said backward direction, the positional offset determining section further configured to correct at least one of said forward-path image and said backward-path image based on the determined positional offset such that respective pixel positions in said forward-path image and said backward-path image lie at positions corresponding to each other in the direction along said forward direction and said backward direction.

2. The radiography apparatus according to claim 1, wherein:

said data processing section is configured to reconstruct a first image based on said first set of projection data and reconstruct a second image based on said second set of projection data; and said positional offset determining section is configured to calculate the positional offset by applying comparison processing to said first image and said second image image-reconstructed by said data processing section.

3. The radiography apparatus according to claim 2, wherein:

said data processing section is configured to produce said first image and said second image as said forward-path image and said backward-path image, respectively, by shifting for correction the pixel position in at least one of said first image and said second image based on the determined positional offset such that respective pixel positions in said first image and said second image lie at positions corresponding to each other in the direction along said forward direction and said backward direction in said region to be imaged.

4. The radiography apparatus according to claim 3, wherein:

said data processing section is configured to reconstruct said first image for a plane along the direction in which the cradle is moved in said forward direction, and reconstruct said second image for the plane for which said first image is image-reconstructed.

5. The radiography apparatus according to claim 4, wherein:

said data processing section is configured to reconstruct said first image by image-reconstructing a plurality of third images for a plurality of planes perpendicular to the direction in which the cradle is moved in said forward direction and said backward direction based on said first set of projection data and then reformatting said image-reconstructed plurality of third images, and reconstruct said second image by image-reconstructing a plurality of fourth images for a plurality of planes perpendicular to the direction in which the cradle is moved in said forward direction and said backward direction based on said second set of projection data and then reformatting said image-reconstructed plurality of fourth images.

6. The radiography apparatus according to claim 2, wherein:

said data processing section is configured to reconstruct said first image for a plane along the direction in which the cradle is moved in said forward direction, and reconstruct said second image for the plane for which said first image is image-reconstructed.

7. The radiography apparatus according to claim 6, wherein:

said data processing section is configured to reconstruct said first image by image-reconstructing a plurality of third images for a plurality of planes perpendicular to the direction in which the cradle is moved in said forward direction and said backward direction based on said first set of projection data and then reformatting said image-reconstructed plurality of third images, and reconstruct said second image by image-reconstructing a plurality of fourth images for a plurality of planes perpendicular to the direction in which the cradle is moved in said forward direction and said backward direction based on said second set of projection data and then reformatting said image-reconstructed plurality of fourth images.

8. The radiography apparatus according to claim 1, wherein:

said positional offset determining section is configured to calculate the positional offset based on a pixel position of a first feature-extracted region extracted by performing feature extraction processing on said first image image-reconstructed by said data processing section, and a pixel position of a second feature-extracted region extracted to match said first feature-extracted region extracted in said first image by performing feature extraction processing on said second image image-reconstructed by said data processing section.

9. The radiography apparatus according to claim 1, further comprising:

a display section configured to display on a display screen an image image-reconstructed for the region to be imaged by said data processing section.

10. The radiography apparatus according to claim 9, wherein said data processing section is configured to reconstruct a plurality of said forward-path images and a plurality of said backward-path images such that said forward-path images and said backward-path images are alternately arranged at positions different from each other in a region to be imaged in said subject in the direction in which the cradle is moved in said forward direction and said backward direction, and said display section is configured to sequentially display said forward-path images and said backward-path images produced by said data processing section alternately as a moving picture on said display screen along the direction in which the cradle is moved in said forward direction and said backward direction.

11. The radiography apparatus according to claim 1, further comprising:
a display section configured to display on a display screen an image image-reconstructed for the region to be imaged by said data processing section; and
an input section via which input data can be input by an operator,
wherein said data processing section is configured to reconstruct a first image based on said first set of projection data and reconstruct a second image based on said second set of projection data,
said display section is configured to display said first image and said second image on said display screen,
said input section is configured to receive from the operator a pixel position of a first specific region in said first image displayed at said display section, and receive a pixel position of a second specific region, corresponding to said first specific region, in said second image displayed at said display section, and
said positional offset determining section is configured to calculate the positional offset based on the pixel position of said first specific region and the pixel position of said second specific region input via said input section.

12. The radiography apparatus according to claim 1, further comprising:
an input section via which input data can be input by an operator,
wherein said input section is configured to receive from the operator positional offset data as input data, and
said positional offset determining section is configured to determine the positional offset based on the positional offset data input via said input section.

13. The radiography apparatus according to claim 1, wherein:
when image-reconstructing said forward-path image for a plane perpendicular to the direction in which the cradle is moved in said forward direction and said backward direction based on said first set of projection data, and image-reconstructing said backward-path image for a plane perpendicular to the direction in which the cradle is moved in said forward direction and said backward direction based on said second set of projection data, said data processing section image-reconstructs said forward-path image and said backward-path image based on the determined positional offset such that said forward-path image and said backward-path image both coincide with a position of the region to be imaged in said subject in the direction in which the cradle is moved in said forward direction and said backward direction.

14. The radiography apparatus according to claim 1, wherein:
said scanning table section moves the cradle such that the direction along said forward direction and said backward direction lies in a horizontal direction.

15. The radiography apparatus according to claim 1, wherein:
said scanning section defines an imaging space for receiving therein the cradle moved in said scanning table section, and has an illuminating section for emitting radiation toward the subject laid on the cradle in said imaging space; and
a detecting section configured to detect radiation emitted from said illuminating section and passing through the subject to thereby generate the projection data.

16. The radiography apparatus according to claim 15, wherein:
said illuminating section emits X-rays as said radiation.

17. The radiography apparatus according to claim 16, wherein:
said scanning section performs said scan in a helical scan scheme.

18. The radiography apparatus according to claim 16, wherein:
said scanning section performs said scan in an axial scan scheme.

19. A method of operating a radiography apparatus, said method comprising:
providing a scanning table section that includes a cradle on which a subject is laid, wherein the scanning table section is configured to move the cradle;
operatively coupling a scanning section to the scanning table, the scanning section configured to:
perform a scan including emitting radiation toward a region to be imaged in the subject, and
detect the radiation passing through the region to be imaged to thereby acquire projection data for the region to be imaged;
operatively coupling a data processing section to the scanning section, the data processing section configured to reconstruct an image for the region to be imaged based on the projection data acquired by the scanning section;
configuring the scanning table section to move the cradle in a forward direction and in a backward direction relative to the scanning section;
configuring the scanning section to:
perform the scan as the cradle is being moved in the forward direction to thereby acquire a first set of projection data, and
perform the scan as the cradle is being moved in the backward direction to thereby acquire a second set of projection data; and
configuring the data processing section to:
reconstruct a forward-path image as the image based on the first set of projection data, and
reconstruct a backward-path image as the image based on the second set of projection data,
wherein the data processing section includes a positional offset determining section configured to determine an amount of positional offset that represents a distance in a direction along the forward direction and the backward direction between a first subject position and a second subject position, the first subject position being a position at which the region to be imaged is scanned when the cradle is moved in the forward direction, and the second subject position being a position at which the region to be imaged is scanned when the cradle is moved in the backward direction, the positional offset determining section further configured to correct at least one of the forward-path image and the backward-path image based on the determined positional offset such that respective pixel positions in the forward-path image and the backward-path image lie at positions corresponding to each other in the direction along the forward direction and the backward direction.

20. The method of operating a radiography apparatus according to claim 19, further comprising operatively coupling a display section to the data processing section, the display section configured to display a reconstructed image of the region to be imaged by the data processing section.

* * * * *